(12) United States Patent
Rao et al.

(10) Patent No.: US 12,420,814 B2
(45) Date of Patent: Sep. 23, 2025

(54) CLOUD-BASED VEHICLE MONITORING PLATFORM

(71) Applicant: HONEYWELL INTERNATIONAL INC., Charlotte, NC (US)

(72) Inventors: Nayyar Azam Khan Rao, Phoenix, AZ (US); Kalimulla Khan, Bangalore (IN); Raghu Shamasundar, Bangalore (IN); Subhransu Sahoo, Bangalore (IN); Kirupakar Janakiraman, Madural (IN)

(73) Assignee: Honeywell International Inc., Charlotte, NC (US)

( * ) Notice: Subject to any disclaimer, the term of this patent is extended or adjusted under 35 U.S.C. 154(b) by 289 days.

(21) Appl. No.: 18/318,333

(22) Filed: May 16, 2023

(65) Prior Publication Data

US 2024/0326842 A1 Oct. 3, 2024

(30) Foreign Application Priority Data

Mar. 28, 2023 (IN) .............................. 202311022530

(51) Int. Cl.
*B60W 50/035* (2012.01)
*G07C 5/00* (2006.01)
*H04L 67/10* (2022.01)
*H04L 67/12* (2022.01)

(52) U.S. Cl.
CPC ........... *B60W 50/035* (2013.01); *G07C 5/008* (2013.01); *H04L 67/10* (2013.01); *H04L 67/12* (2013.01)

(58) Field of Classification Search
CPC .................................................. B60W 50/035
See application file for complete search history.

(56) References Cited

U.S. PATENT DOCUMENTS

| 6,907,416 B2 | 6/2005 | Tasooji et al. |
| 6,993,675 B2 * | 1/2006 | Roddy ................ G06F 11/0748 701/19 |
| 10,219,750 B2 * | 3/2019 | Duan ....................... B60H 3/02 |

(Continued)

OTHER PUBLICATIONS

Communication about intention to grant a European patent Mailed on Jan. 14, 2025 for EP Application No. 24161488, 6 page(s).

(Continued)

*Primary Examiner* — Michael A Berns
(74) *Attorney, Agent, or Firm* — Alston & Bird LLP

(57) ABSTRACT

Embodiments of the present disclosure are directed to a cloud-based vehicle monitoring platform (CVMP) configured to manage events impacting the operation of a plurality of vehicles. An onboard vehicle monitoring system associated with a particular vehicle is communicably coupled to CVMP centralized services and can determine corrective actions to employ to mitigate the events. The corrective actions in some contexts are generated by a rules engine based on a rule set generated by a federated learning model associated with the CVMP centralized services. If the onboard vehicle monitoring system determines that a first set of corrective actions generated based on a first set of rules is unsuccessful at mitigating the events, the onboard vehicle monitoring system can request a secondary set of rules from the CVMP centralized services. Various data recovery operations in some contexts are employed to revert the vehicle from a problem state back into a steady state.

20 Claims, 7 Drawing Sheets

(56) References Cited

U.S. PATENT DOCUMENTS

| | | | |
|---|---|---|---|
| 10,977,881 | B1 | 4/2021 | Buentello et al. |
| 11,080,950 | B2 | 8/2021 | McQuade et al. |
| 11,861,458 | B2 * | 1/2024 | Clément ................ G07C 5/085 |
| 2004/0025082 | A1 | 2/2004 | Roddy et al. |
| 2006/0229777 | A1 | 10/2006 | Hudson et al. |
| 2012/0041637 | A1 | 2/2012 | Allemang |
| 2018/0092603 | A1 | 4/2018 | Duan et al. |
| 2020/0065711 | A1 | 2/2020 | Lurie et al. |
| 2021/0134084 | A1 | 5/2021 | Toth et al. |
| 2022/0159056 | A1 * | 5/2022 | Rose ....................... G06F 21/32 |
| 2023/0177349 | A1 * | 6/2023 | Balakrishnan .......... H04L 67/10 |
| | | | 706/25 |
| 2024/0326842 | A1 * | 10/2024 | Rao ........................ G07C 5/008 |

OTHER PUBLICATIONS

EP Office Action Mailed on Sep. 18, 2024 for EP Application No. 24161488, 8 page(s).

Decision to grant a European patent Mailed on May 9, 2025 for EP Application No. 24161488, 3 page(s).

\* cited by examiner

CLOUD-BASED VEHICLE MONITORING PLATFORM

CROSS-REFERENCE TO RELATED APPLICATION

This application claims priority and benefit of Indian patent application Ser. No. 202311022530 filed Mar. 28, 2023, the content of which is incorporated by reference in its entirety.

TECHNICAL FIELD

Embodiments of the present disclosure generally relate to managing events associated with the operation of a vehicle, and specifically to a cloud-based vehicle monitoring platform configured to generate corrective actions associated with multiple events impacting the operation of an aerial vehicle.

BACKGROUND

The aerospace industry is heavily regulated and there are many operating requirements that affect how an aerospace enterprise can operate a fleet of aerial vehicles. Multiple systems associated with an aerial vehicle must be monitored for any deviations from the respective specifications associated with the systems, but even nominal system operations must be recorded and stored for various inspections and audits associated with the aerial vehicle. Traditionally, avionic recording systems have been based on static rules and/or configurations. The data that is captured by traditional avionic recording systems during flight is traditionally only analyzed post-flight, and this post-flight analysis is used to generate preventive actions to handle contingencies that may affect subsequent flights. However, due to limited onboard storage mediums and a lack of connectivity in the cockpit, there are limited avenues to configure the type and amount of data to be recorded by traditional avionic recording systems.

Furthermore, in many circumstances, there are multiple factors that can impact the efficiency, safety, and/or operation of an aerial vehicle. Various sensors, monitors, and systems associated with the aerial vehicle may provide raw data related to particular operational components of the aerial vehicle to provide situational awareness, contextual information, and/or other helpful data to operator(s) of the aerial vehicle. However, as multiple events impacting the operation of the aerial vehicle occur, the operator(s) of the aerial vehicle may have a limited amount of time and/or knowledge with which to evaluate the specific scope and criticality of the events and, as such, may not be able to accurately determine an appropriate mitigative action with which to address the events.

Inventors have discovered problems with current implementations of vehicle management techniques related to aerial vehicles. Through applied effort, ingenuity, and innovation, the inventors have solved many of these problems by developing the solutions embodied in the present disclosure, the details of which are described further herein.

BRIEF SUMMARY

In general, embodiments of the present disclosure herein provide a distributed framework for managing multiple events impacting the operation of an aerial vehicle. Other implementations will be, or will become, apparent to one with skill in the art upon examination of the following figures and detailed description. It is intended that all such additional implementations be included within this description be within the scope of the disclosure and be protected within the scope of the following claims.

In accordance with a first aspect of the present disclosure, a computer-implemented method for managing one or more events impacting the operation of a vehicle is provided. The computer-implemented method is performable by one or more specially configured computing device(s) embodied in hardware, software, firmware, and/or any combination thereof, for example as described herein. In one example embodiment, the example computer-implemented method includes determining, by a vehicle state evaluation model of an onboard vehicle monitoring system, a steady state of a vehicle, where the steady state of the vehicle is determined based in part on a first portion of vehicle operation data. The example computer-implemented method also includes determining, by a vehicle state evaluation model of an onboard vehicle monitoring system, a steady state of a vehicle, where the steady state of the vehicle is determined based in part on a first portion of vehicle operation data. The example computer-implemented method also includes determining, by the vehicle state evaluation model of the onboard vehicle monitoring system and based in part on a second portion of vehicle operation data, one or more events impacting operation of the vehicle, where the one or more events impacting the operation of the vehicle cause the vehicle to enter into a problem state.

The example computer-implemented method also includes generating, by a rules engine of the onboard vehicle monitoring system, a first set of corrective actions, where the first set of corrective actions is based in part on a first rule set. The example computer-implemented method also includes where the rules engine is configured based in part on at least one of the first rule set or a subset of a federated learning model associated with cloud-based monitoring platform (CVMP) centralized services of a CVMP. The example computer-implemented method also includes determining, based in part on executing the first set of corrective actions generated by the rules engine, that the vehicle cannot revert back into the steady state from the problem state. The example computer-implemented method also includes, in response to determining that the vehicle cannot revert back into the steady state by executing the first set of corrective actions, requesting, from the CVMP centralized services, a second rule set related to event management of the vehicle by transmitting at least the second portion of vehicle operation data to the CVMP centralized services. The example computer-implemented method also includes receiving the second rule set from the CVMP centralized services, where the second rule set is generated by the federated learning model associated with the CVMP centralized services.

The example computer-implemented method also includes configuring, based in part on at least one of the second rule set or the subset of the federated learning model, the rules engine of the onboard vehicle monitoring system. The example computer-implemented method also includes generating, based in part on the second rule set, a second set of corrective actions. The example computer-implemented method also includes determining that the vehicle can revert back into the steady state from the problem state by executing the second set of corrective actions. The example computer-implemented method also includes, in response to determining that the vehicle can revert back into the steady state by executing the second set of corrective actions, causing execution of at least a portion of the second set of corrective actions to revert the vehicle back into the steady state from the problem state.

The example computer-implemented method further includes transmitting steady state data related to the steady state of the vehicle to the CVMP centralized services, where transmitting the steady state data causes storage of the steady state data in a data store associated with the CVMP centralized services.

The example computer-implemented method further includes retrieving the steady state data from the data store associated with the CVMP centralized services; and configuring one or more respective vehicle systems of the vehicle based in part on the steady state data.

The example computer-implemented method further includes where one or more respective corrective actions of the first set of corrective actions and the second set of corrective actions are ranked based at least in part on a predicted result associated with execution of the one or more respective corrective actions.

The example computer-implemented method further includes transmitting event mitigation data to the CVMP centralized services, where the event mitigation data comprises at least one of data related to the one or more events that caused the vehicle to enter into the problem state, data related to one or more respective rules comprised in the first rule set and the second rule set, or data related to one or more respective corrective actions associated with the one or more respective rules comprised in the first rule set and the second rule set. The example computer-implemented method also includes where the data related to the one or more respective corrective actions is indicative of whether the one or more respective corrective actions were successful or unsuccessful in causing the vehicle to revert back into the steady state from the problem state.

The example computer-implemented method further includes where transmitting the event mitigation data to the CVMP centralized services causes updating of the federated learning model.

The example computer-implemented method further includes where the steady state data of the vehicle comprises at least one of data indicative of a configuration of one or more vehicle systems onboard the vehicle, data related to a set of vehicle operation constraints, or data related to the first portion of vehicle operation data associated with the steady state of the vehicle.

The example computer-implemented method further includes causing rendering of an alert generated by the vehicle state evaluation model on one or more computing devices associated with the CVMP, where the alert comprises data related to at least one of the problem state associated with the vehicle or the one or more events impacting the operation of the vehicle.

The example computer-implemented method further includes where the federated learning model is iteratively retrained based in part on event mitigation data associated with a plurality of vehicles associated with the CVMP centralized services.

The example computer-implemented method further includes where the federated learning model is iteratively retrained on based on a predefined schedule.

The example computer-implemented method further includes where the second portion of vehicle operation data comprises at least one of data indicative of a nominal scenario, data indicative of an emergency scenario, data indicative of a hazard scenario, data indicative of a logistical scenario that alters a voyage of the vehicle, or data indicative of a change in the operation of a vehicle system affecting control of the vehicle.

The example computer-implemented method further includes where the second portion of vehicle operation data is based at least in part on vehicle sensor data gathered by one or more sensors associated with the vehicle.

The example computer-implemented method further includes determining, by the vehicle state evaluation model of the onboard vehicle monitoring system, an event severity level associated with the one or more events impacting the operation of the vehicle.

The example computer-implemented method further includes where the event severity level associated with the one or more events is determined based in part on a respective event type associated with the one or more events impacting the operation of the vehicle.

The example computer-implemented method further includes where the CVMP is associated with an Internet-of-Things (IoT) sensing and control system.

In accordance with a second aspect of the disclosure, an apparatus for managing one or more events impacting the operation of a vehicle is provided. In one example embodiment, the apparatus includes at least one processor and at least one memory having computer-coded instructions stored thereon, where the computer-coded instructions in execution with the at least one processor causes the apparatus to perform any one of the example computer-implemented methods described herein. In a second example embodiment apparatus, the apparatus includes means for performing each step of any one of the example computer-implemented methods described herein.

In accordance with a third aspect of the disclosure, a computer program product for managing one or more events impacting the operation of a vehicle is provided. In one example embodiment computer program product, the computer program product includes at least one non-transitory computer-readable storage medium having computer program code stored thereon that, in execution with at least one processor, configures the computer program product for performing any one of the example computer-implemented methods described herein.

The above summary is provided merely for the purpose of summarizing some example embodiments to provide a basic understanding of some aspects of the present disclosure. Accordingly, it will be appreciated that the above-described embodiments are merely examples and should not be construed to narrow the scope or spirit of the present disclosure in any way. It will be appreciated that the scope of the present disclosure encompasses many potential embodiments in addition to those here summarized, some of which will be further described below. Other features, aspects, and advantages of the subject will become apparent from the description, the drawings, and the claims.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
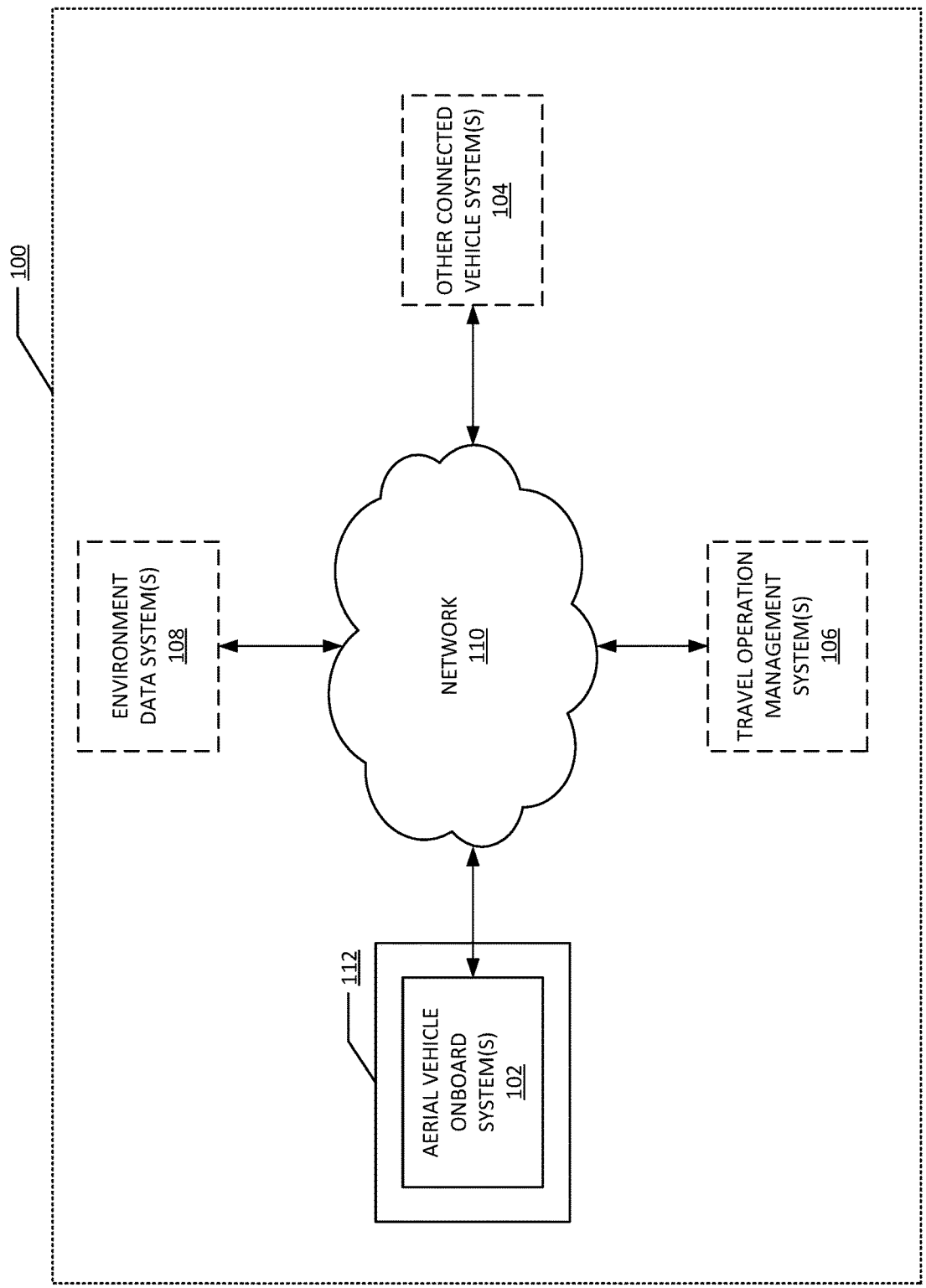
FIG. 1 illustrates an example system that enables vehicle management for one or more vehicles associated with a cloud-based vehicle monitoring platform (CVMP) in accordance with at least some example embodiments of the present disclosure.

Embodiments of the present disclosure now will be described more fully hereinafter with reference to the accompanying drawings, in which some, but not all, embodiments of the disclosure are shown. Indeed, embodiments of the disclosure may be embodied in many different forms and should not be construed as limited to the embodiments set forth herein, rather, these embodiments are provided so that this disclosure will satisfy applicable legal requirements. Like numbers refer to like elements throughout.

Overview

Vehicle systems associated with various types of vehicles comprise complex hardware and software modules in order to facilitate safe operation of the various types of vehicles. A modern vehicle may contain several) systems that are integrated together to perform complex functions related to the operation of the vehicle. Because various branches of the transportation industry are heavily regulated and there are many operating requirements that affect how an enterprise can operate a fleet of vehicles, the multiple systems associated with the vehicle must be monitored for any deviations from the respective specifications associated with the systems. Even nominal system operations must be recorded and stored for various inspections and audits associated with the vehicle.

Moreover, as the various branches of the transportation industry move ever towards semi-autonomously and autonomously controlled vehicles, upcoming operators, pilots, drives, and/or crew members in the field may have further limited knowledge and/or limited experience with which to make crucial decisions regarding one or more events impacting the operation of the vehicle. In this regard, the cognitive workload for the operator to gain a complete situational awareness based at least in part on disparate data coming from a multitude of sources remains high or even may increase, and, in some circumstances, it is difficult or impossible for an operator to make an accurate decision and perform a corresponding action based at least in part on the many nuances of a given, often time-sensitive, situation.

Various contextual information can pertain to data gathered by one or more sensors associated with the vehicle, data received via a communications network, and/or data provided by an operator and/or flight crew member. Frequently, distinct portions of data related to various aspects of the operation of the vehicle are being simultaneously generated and/or received throughout the duration of a flight, requiring the operator to be constantly analyzing the incoming data. In some circumstances, as various events occur that can impact the operation of the vehicle, the operator may only have a limited amount time to analyze vehicle operation data and/or any other incoming data pertinent to the operation of the vehicle. For example, depending on the complexity of the events, the operator may not have the time and/or skill to analyze the potential outcomes of any actions taken to mitigate the events impacting the operation of the vehicle.

Embodiments of the present disclosure are configured to address the limitations of traditional avionic management systems by providing a cloud-based vehicle monitoring platform (CVMP) configured to monitor the operation of one or more vehicles to identify and mitigate one or more events that can impact the operation of the one or more vehicles. Embodiments provide connectivity between CVMP centralized services and an onboard vehicle monitoring system that monitors the various avionics systems of a respective vehicle. The CVMP centralized services are configured to host computations that are remotely configured, executed, and/or broadcast to one or more onboard vehicle monitoring systems associated with one or more respective multiple vehicles. The CVMP provides multiple services including, but not limited to, a configurable data logging service for both normal and abnormal operational situations, an event monitoring and alerting service, an avionics data recovery service, as well as modelling and dissipation of dynamic rule sets associated with the management of one or more vehicles.

Furthermore, in various embodiments, the CVMP can integrate with, or be embodied by, an Internet-of-things (IoT) sensing and control system (SCS) related to a particular enterprise. The IoT SCS can be a system for enterprise performance management that embodies one or more IoT services that employ real-time accurate models and visual analytics to deliver intelligent actionable recommendations and/or analytics for sustained peak performance of the enterprise. The IoT SCS is an extensible platform that is portable for deployment in any cloud or data center environment for providing an enterprise-wide, top-to-bottom view, displaying the status of vehicles, processes, assets, people, and/or safety. In various embodiments, the IoT SCS can be an existing framework (e.g., a cloud-based enterprise architecture) associated with a particular enterprise. As a non-limiting example, the IoT SCS can be an existing framework associated with an industrial processing and manufacturing enterprise, where the IoT SCS is configured to manage one or more industrial assets related to one or more industrial processes associated with the enterprise. The industrial processing and manufacturing enterprise may acquire and/or employ a fleet of vehicles for facilitating one or more operations and, as such, may desire the capacity to execute one or more of the vehicle monitoring and/or vehicle management operations described herein.

Embodiments feature an onboard vehicle monitoring system associated with a vehicle that is in constant communication with the CVMP centralized services. In some embodiments, the onboard vehicle monitoring system is an application instance configured to integrate with one or more vehicle systems and/or apparatuses associated with a vehicle managed by the CVMP. As such, one or more onboard vehicle monitoring system(s) associated with one or more vehicles (e.g., a fleet of vehicles associated with a particular enterprise) can enable the CVMP centralized services to function as a centralized system for facilitating the management of the one or more vehicles. In various embodiments, the onboard monitoring system can integrate with, or be embodied by, a computing device such as a line replaceable unit (LRU) associated with a vehicle.

The onboard vehicle monitoring system comprises, among other components, a vehicle state evaluation model and a rules engine configured to determine and/or mitigate one or more events impacting the operation of the vehicle. The vehicle state evaluation model in some contexts is configured as a machine learning (ML) model deployed to continually receive one or more portions of vehicle operation data, vehicle sensor data, vehicle system data, air traffic data, environmental data, logistical data, personnel data, and/or any other relevant data related to a particular vehicle. Such data in some contexts is generated, measured, calculated, and/or otherwise obtained from the one or more computing devices comprised in both a vehicle and/or the CVMP centralized services and configured as model input for the vehicle state evaluation model. The vehicle state evaluation model can determine based at least in part on the model input that one or more events are occurring that may impact the operation of the vehicle. Additionally, the vehicle state evaluation model can classify an event severity level associated with the one or more events.

The vehicle state evaluation model can determine that a vehicle is in a steady state (e.g., a nominal operational state) or a problem state (e.g., an adverse operational state). The vehicle state evaluation model can generate one or more portions of model output configured to describe the current status, operational parameters, data values, operational modes, and/or configurations of one or more vehicle systems associated with the vehicle. In this regard, if the vehicle state evaluation model determines that one or more events are taking place that are impacting the operation of the vehicle, the vehicle state evaluation model can determine how the one or more events are related to (e.g., how the one or more events are impacting) the respective vehicle systems.

As such, the vehicle state evaluation model can generate one or more contextual data snapshots related to the current operational status of the vehicle as model output. The contextual data snapshots are one or more portions of data that have been configured for logging, analysis, ML model input, ML model training, and/or storage. For example, a contextual data snapshot may capture the steady state (e.g., nominal state) of the vehicle by logging, storing, and/or otherwise saving a current configuration of the one or more vehicle systems as well as how the configuration of the one or more vehicle systems relates to the current nominal operation of the vehicle. The vehicle state evaluation model can also generate a contextual data snapshot capturing a problem state (e.g., an adverse operational state) related to one or more events impacting the operation of the vehicle and the respective vehicle systems associated with the vehicle. The vehicle state evaluation model can transmit one or more contextual data snapshots to the rules engine associated with the onboard vehicle monitoring system.

A contextual data snapshot associated with a steady state of a particular vehicle in some contexts is used in one or more data recovery operations for reverting the particular vehicle from a problem state back into a steady state. For example, the contextual data snapshot associated with the steady state can comprise one or more operational parameters, data values, operational modes, and/or configurations of one or more vehicle systems. As such, the contextual data snapshot associated with the steady state in some contexts is utilized to reconfigure, re-initialize, and/or otherwise update the one or more vehicle systems such that the vehicle resumes operating in a manner congruent with the corresponding steady state.

The rules engine is configured to generate one or more corrective actions for mitigating the one or more events based in part on one or more rules in response to receiving model output (e.g., a contextual data snapshot) generated by the vehicle state evaluation model. For example, in various embodiments, the rules engine comprises a time series data analysis model configured to generate the one or more corrective actions based in part on the one or more rules in response to receiving model output (e.g., a contextual data snapshot) generated by the vehicle state evaluation model. The rules engine in some contexts is configured to execute, or cause execution, of the one or more corrective actions based on the one or more rules. For example, in one or more embodiments, the rules engine can direct the CVMP vehicle apparatus to execute the one or more corrective actions by operating, updating configurations for, and/or otherwise controlling one or more respective vehicle system(s) associated with a vehicle.

Furthermore, the rules engine is configured to determine, in conjunction with the vehicle state evaluation model, if the one or more corrective actions that were executed have successfully reverted the vehicle back to a steady state from a problem state. For example, if the rules engine determines, in conjunction with the vehicle state evaluation model, that a first set of corrective actions generated based on a first set of rules have been executed but the vehicle remains in the problem state (or has entered into a new problem state), the rules engine can cause generation of a request for a second set of rules. For example, the rules engine can cause the generation of a request for additional rules based on a current operational context and/or the one or more events impacting the operation of the vehicle. The rules engine can cause the transmission (e.g., via a node manager associated with the onboard vehicle monitoring system) of the request to the CVMP centralized services. In response to the request, the CVMP offboard apparatus can direct the federated learning model associated with the CVMP centralized services to generate, select, retrieve, and/or otherwise determine a second set of rules to transmit to the onboard vehicle monitoring system of the vehicle. Upon receipt of the second set of rules, the rules engine can generate a second set of corrective actions with which to mitigate the one or more events impacting the operation of the vehicle.

The onboard vehicle monitoring system is configured to log and/or transmit one or more portions of data related to the vehicle to the CVMP centralized services and/or the IoT SCS. For example, the onboard vehicle monitoring system is configured to transmit one or more portions of even mitigation data related to the mitigation of one or more events that previously impacted the operation of the vehicle as well as data related to the rules, corrective actions, and/or system configurations that led to the resolution of the one or more events for use in improving the functionalities of the federated learning model associated with the CVMP centralized services. In this regard, the federated learning model associated with the CVMP centralized services in some contexts are iteratively retrained and/or otherwise updated based on data related to one or more vehicles associated with the CVMP and/or data received from an IoT SCS related to the CVMP.

For example, the federated learning model in some contexts is trained and/or retrained based in part on one or more portions of event mitigation data related to one or more vehicles associated with one or more respective enterprises related to the CVMP. The event mitigation data can comprise data related to the one or more events that caused a particular vehicle to enter into a problem state and/or data related to one or more respective rules and/or corrective actions with which the onboard vehicle monitoring system employed to mitigate the one or more events. In this regard, the federated learning model is constantly updated based on a global corpus of event mitigation data related to many vehicles associated with many respective enterprises. As such, the federated learning model is consistently improving in both accuracy and efficiency when determining which rules to transmit to a particular vehicle based on one or more events impacting the operation of the particular vehicle.

Embodiments of the present disclosure enable an operator of the vehicle to reduce the time required to accurately perform an analysis of the current situation associated with the vehicle, generate potential solutions based at least in part on the analysis, and ultimately decide upon an optimal solution. By enabling quicker action, such embodiments thus reduce the likelihood of errors, unsafe scenarios, and/or other disastrous circumstances arising from incorrect decisions made by an operator and/or delayed decision-making by the operator due to circumstances associated with the one or more events impacting the operation of the vehicle. Furthermore, the CVMP can support one or more operators that may lack the knowledge and/or experience with which to timely mitigate the one or more events in order to ensure the safety, efficiency, and optimal operation of the vehicle, the vehicle crew, and/or the passengers of the vehicle.

It will be appreciated that embodiments of the present disclosure may be advantageous for a myriad of vehicle types. In this regard, aerial vehicles are utilized as an exemplary type of vehicle for purposes of simplifying the disclosure. The description specific to aerial vehicles should not limit the scope and spirit of the disclosure unless otherwise explicitly stated. For example, the methods described herein may be applicable to the fields of autonomous automobile operation, autonomous watercraft operation, and/or the like.

Definitions

"Cloud-based vehicle monitoring platform (CVMP)" refers to a distributed vehicle monitoring platform configured to monitor the operation of one or more vehicles to identify and mitigate one or more events that can impact the operation of the one or more vehicles. A CVMP in some contexts is associated with one or more enterprises such as, for example, a logistics enterprise, a delivery and shipment enterprise, a commercial airline, an aerial delivery enterprise, an urban air mobility (UAM) enterprise, an advanced air mobility (AAM) enterprise, a military enterprise, and/or the like that manages and/or deploys a fleet of vehicles. The CVMP in some contexts includes and/or integrate with one or more system(s), computing device(s), service(s), and/or data store(s). For example, the CVMP can interface with one or more travel operation management system(s), environment data system(s), air traffic control system(s), urban air mobility (UAM) systems, and/or the like. Furthermore, in various embodiments, the CVMP is configured to integrate with, or be embodied by, an internet-of-things (IoT) sensing and control system (SCS) associated with a particular enterprise.

The CVMP contains centralized services configured for the offboard management and control of a fleet of vehicles associated with an enterprise. In this regard, the CVMP is configured as a distributed management system such that one or more vehicles integrate with a respective onboard vehicle monitoring system communicably coupled to the CVMP centralized services. The CVMP centralized services, in conjunction with a particular instance of the onboard vehicle monitoring system associated with a particular vehicle, are configured to manage and/or mitigate one or more events impacting the particular vehicle.

The CVMP centralized services and one or more onboard vehicle monitoring system(s) associated with one or more respective vehicles remain in constant contact and are configured to transmit and/or receive data related to the operation of the one or more vehicles via a communications network. The CVMP centralized services comprise one or more computing device(s), one or more machine learning (ML) model(s), and/or one or more data store(s) configured to monitor and/or manage one or more vehicles. For example, in one or more embodiments, the CVMP centralized services comprise a federated learning model configured to generate, select, retrieve, and/or otherwise determine one or more rule(s) configured to facilitate the mitigation of one or more respective events impacting the operation of one or more vehicles.

"Internet-of-things (IoT) sensing and control system (SCS)" refers to a system for enterprise performance management that embodies one or more IoT services that employ real-time accurate models and visual analytics to deliver intelligent actionable recommendations and/or analytics for sustained peak performance of the enterprise. The IoT SCS is an extensible platform that is portable for deployment in any cloud or data center environment for providing an enterprise-wide, top-to-bottom view, displaying the status of vehicles, processes, assets, people, and/or safety. The IoT SCS in some contexts are an existing framework (e.g., cloud-based enterprise architecture) associated with a particular enterprise. In this regard, an IoT SCS associated with the particular enterprise, in some embodiments, hosts, embodies, integrates with, configures, and/or otherwise employs the CVMP centralized services to manage a fleet of vehicles associated with the particular enterprise. The IoT SCS remains in constant communication with the CVMP centralized services via one or more communications networks.

"Onboard vehicle monitoring system" refers to hardware, software, firmware, and/or a combination thereof, that embodies and/or maintains an application instance configured to integrate with one or more vehicle systems and/or apparatuses associated with a vehicle managed by the CVMP. The onboard vehicle monitoring system comprises, among other components, a rules engine and a vehicle state evaluation model configured to determine and/or mitigate one or more events impacting the operation of the vehicle. The onboard monitoring system in some contexts integrates with, or be embodied by, a computing device such as a line replaceable unit (LRU). For example, the onboard vehicle monitoring system in some contexts is embodied by an aerospace gateway LRU configured to communicate with one or more vehicle system(s). The CVMP centralized services and one or more onboard vehicle monitoring system (s) associated with one or more respective vehicles remain in constant communication and are configured to transmit and/or receive data related to the operation of the one or more vehicles via a communications network.

The onboard vehicle monitoring system in some contexts generates and transmit one or more requests to the CVMP centralized services via the communications network. The one or more requests include, but are not limited to, a request for one or more rules with which to initialize the rules engine, a request for additional rules with which to address a particular event impacting the operation of the vehicle, and/or a request for one or more portions of data including, but not limited to, environmental data, travel operation management data, vehicle data, logistics data, hazard data, air traffic data, and/or the like.

Additionally, the onboard vehicle monitoring system is configured to log and/or transmit one or more portions of data related to the vehicle to the CVMP centralized services and/or the IoT SCS. For example, the onboard vehicle monitoring system is configured to transmit one or more portions of even mitigation data related to the mitigation of one or more events that previously impacted the operation of the vehicle as well as data related to the rules, corrective actions, and/or system configurations that led to the resolution of the one or more events.

"Federated learning model" refers to an ML model associated with the CVMP centralized services that is configured to determine one or more rules related to the event management of a vehicle to transmit to a particular vehicle in response to a request generated by an onboard vehicle monitoring system associated with the particular vehicle. In various embodiments, the federated learning model in some contexts is configured as a deep learning neural network such as an artificial neural network, (ANN), recurrent neural network (RNN), convolutional neural network (CNN), and/or any other specialized deep learning neural network. Based on a request generated by an onboard vehicle monitoring system associated with a particular vehicle, the federated learning model can generate, select, retrieve, and/or otherwise determine one or more rules to transmit to the particular vehicle based on the request, where the one or more rules are configured to facilitate the mitigation of one or more respective events impacting the operation of the particular vehicle.

A federated learning model associated with the CVMP centralized services in some contexts are iteratively retrained and/or otherwise updated based on data related to one or more vehicles associated with the CVMP and/or data received from an IoT SCS related to the CVMP. For example, the federated learning model in some contexts is trained and/or retrained based in part on one or more portions of event mitigation data related to one or more vehicles associated with one or more respective enterprises related to the CVMP. The event mitigation data comprises but is not limited to data related to the one or more events that caused a particular vehicle to enter into a problem state and/or data related to one or more respective rules and/or corrective actions with which the onboard vehicle monitoring system employed to mitigate the one or more events. In this way, the federated learning model in some contexts is constantly updated based on a global corpus of event mitigation data related to many vehicles associated with many respective enterprises. As such, the federated learning model is consistently improving in both accuracy and efficiency when determining which rules to transmit to a particular vehicle based on one or more events impacting the operation of the particular vehicle. In certain embodiments, the federated learning model is retrained and/or otherwise updated on a predefined schedule such as, for example, daily, weekly, bi-weekly, monthly, and/or the like.

"Event" refers to a data-driven determination or characteristic of an effect or operational state of a vehicle or subsystem thereof. For instance, an event in some contexts is an emergency situation impacting the operation of the vehicle and/or one or more persons associated with the vehicle. An event in some contexts can also be a circumstance affecting the optimization of one or more vehicle systems associated with the vehicle. A few non-limiting examples of event types that in some contexts is associated with a respective event include, an emergency event type, a hazard event type, a mechanical failure event type, a logistical event type, an environmental event type, an optimization event type, a personnel health event type, and/or the like. Determination of an event in some contexts is based in part on one or more portions of vehicle operation data. The vehicle state evaluation model associated with an onboard vehicle monitoring system is configured to identify, classify, categorize, and/or analyze one or more events impacting the operation of a vehicle.

"Event mitigation data" refers to data related to one or more respective rules and/or one or more respective corrective actions associated with the one or more respective rules that were employed to mitigate, correct, and/or otherwise address the one or more events impacting the operation of the particular vehicle. The event mitigation data indicates whether the one or more respective rules and/or corrective actions associated with the rules were successful or unsuccessful in causing the particular vehicle to revert back into the steady state from the problem state. The event mitigation data in some contexts is configured to train, retrain, and/or otherwise updated the federated learning model associated with the CVMP centralized services. In some embodiments, transmitting the event mitigation data to the CVMP centralized services and/or the IoT SCS causes automatic updating of the federated learning model. Additionally, the event mitigation data in some contexts is transmitted to the CVMP centralized services and/or the IoT SCS (e.g., via a data publisher associated with the onboard vehicle monitoring system) on a predefined schedule. For example, the onboard vehicle monitoring system of a particular vehicle can cause the event mitigation data to be transmitted to the CVMP centralized services and/or the IoT SCS every night the particular vehicle is parked and connected to a communications network associated with the CVMP centralized services and/or the IoT SCS.

"Vehicle operation data" refers to data indicative of an operational state of a vehicle or a particular subsystem thereof. Non-limiting examples of vehicle operation data includes at least one data value indicating whether a vehicle is operating in a nominal scenario, data indicative of an emergency scenario, data indicative of a hazard scenario, data indicative of a logistical scenario that alters the voyage of the vehicle, and/or data indicative of a change in the operation of a system affecting control of the vehicle. Vehicle operation data also comprise data collected, measured, obtained, generated, and/or otherwise processed by the one or more vehicle system(s) associated with the vehicle. In various embodiments, one or more portions of vehicle operation data in some contexts is received from the CVMP centralized services via a communications network. In various embodiments, at least a portion of the vehicle operation data is based at least in part on vehicle sensor data collected, measured, calculated, and/or otherwise generated by one or more sensors associated with the vehicle.

"Vehicle sensor data" refers to electronically managed data utilized by a vehicle for operation that is captured by at least one sensor onboard or otherwise communicable with the vehicle. Vehicle sensor data in some contexts is any data collected, measured, calculated, and/or otherwise generated by one or more sensors associated with the vehicle.

"Vehicle state evaluation model" refers to an ML model that is specially configured to receive one or more portions of vehicle operation data and, based at least in part on the one or more portions of vehicle operation data, generate one or more portions of model output describing one or more operational states of the vehicle. Additionally, the vehicle state evaluation model associated with an onboard vehicle monitoring system is configured to identify, classify, categorize, and/or analyze one or more events impacting the operation of a vehicle.

The vehicle state evaluation model determines whether the vehicle is in a steady state (e.g., a nominal operational state) or a problem state (e.g., an adverse operational state). The vehicle state evaluation model in some contexts generates one or more portions of model output configured to describe the current status, operational parameters, data values, operational modes, and/or configurations of one or more vehicle systems associated with the vehicle. In this regard, if the vehicle state evaluation model determines that one or more events are taking place that are impacting the operation of the vehicle, the vehicle state evaluation model determines how the one or more events are related to (e.g., how the one or more events are impacting) the respective vehicle systems.

As such, the vehicle state evaluation model generates one or more contextual data snapshots related to the current operational status of the vehicle as model output. The contextual data snapshots are one or more portions of data that have been configured for logging, analysis, ML model input, ML model training, and/or storage. For example, a contextual data snapshot in some contexts captures the steady state (e.g., nominal state) of the vehicle by logging, storing, and/or otherwise saving a current configuration of the one or more vehicle systems as well as how the configuration of the one or more vehicle systems relates to the current nominal operation of the vehicle. Similarly, the vehicle state evaluation model in some contexts generates a contextual data snapshot capturing a problem state (e.g., an adverse operational state) related to one or more events impacting the operation of the vehicle and the respective vehicle systems associated with the vehicle. The vehicle state evaluation model in some contexts transmits one or more contextual data snapshots to the rules engine associated with the onboard vehicle monitoring system.

A contextual data snapshot associated with a steady state of a particular vehicle in some contexts is used in one or more data recovery operations for reverting the particular vehicle from a problem state back into a steady state. For example, the contextual data snapshot associated with the steady state in some contexts comprises one or more operational parameters, data values, operational modes, and/or configurations of one or more vehicle systems. As such, the contextual data snapshot associated with the steady state in some contexts is utilized to reconfigure, re-initialize, and/or otherwise update the one or more vehicle systems such that the vehicle resumes operating in a manner congruent with the corresponding steady state. In various embodiments, one or more portions of data related to the current operational state of the vehicle, one or more contextual data snapshots, one or more portions of vehicle operation data, and/or any data generated and/or managed by the vehicle state evaluation model in some contexts is rendered via one or more computing device(s) associated with the CVMP centralized services.

"Rules engine" refers to one or more statistical, algorithmic, and/or ML models associated with the onboard vehicle monitoring system that is configured to receive, evaluate, enforce, and/or incorporate one or more rules provided by the federated learning model associated with the CVMP centralized services. The rules engine in some contexts comprises one or more ML models, math models, rule expression models, ANNs, RNNs, CNNs, and/or the like. In various embodiments, the rules engine comprises a time series data analysis model. In various embodiments, the rules engine in some contexts is configured in part by the one or more rules received by the federated learning model. Additionally or alternatively, the rules engine can be configured based in part on a subset of the federated learning model associated with the CVMP centralized services.

The rules engine is configured to generate one or more corrective actions based in part on one or more rules in response to receiving model output (e.g., contextual data snapshots) generated by the vehicle state evaluation model. For example, in various embodiments, the rules engine comprises a time series data analysis model configured to generate the one or more corrective actions based in part on the one or more rules in response to receiving model output (e.g., contextual data snapshots) generated by the vehicle state evaluation model. The rules engine in some contexts is configured to execute, or cause execution, of the one or more corrective actions based on the one or more rules. For example, in one or more embodiments, the rules engine in some contexts directs the CVMP vehicle apparatus to execute the one or more corrective actions by operating, updating configurations for, and/or otherwise controlling one or more respective vehicle system(s) associated with a vehicle.

Additionally, the rules engine in some contexts determines which corrective actions of a set corrective actions will have the greatest positive effect on the current situation associated with a vehicle being impacted by one or more events. For example, in some embodiments, the rules engine ranks one or more corrective actions of the set of corrective actions based at least in part on a predicted result associated with the execution of the one or more corrective actions. For instance, a first corrective action in some contexts is ranked higher relative to a second corrective action based at least in part on a predicted result associated with the first corrective action.

Furthermore, the rules engine is configured to determine, in conjunction with the vehicle state evaluation model, if the one or more corrective actions that were executed have successfully reverted the vehicle back to a steady state from a problem state. For example, if the rules engine determines, in conjunction with the vehicle state evaluation model, that a first set of corrective actions generated based on a first set of rules have been executed but the vehicle remains in the problem state (or has entered into a new problem state), the rules engine causes generation of a request for a second set of rules. For example, the rules engine in some contexts causes the generation of a request for additional rules based on a current operational context and/or the one or more events impacting the operation of the vehicle. The rules engine can cause the transmission (e.g., via a node manager associated with the onboard vehicle monitoring system) of the request to the CVMP centralized services. In response to the request, the CVMP offboard apparatus can direct the federated learning model associated with the CVMP centralized services to generate, select, retrieve, and/or otherwise determine a second set of rules to transmit to the onboard vehicle monitoring system of the vehicle. Upon receipt of the second set of rules, the rules engine can generate a second set of corrective actions with which to mitigate the one or more events impacting the operation of the vehicle.

"Corrective action" refers to electronically managed data representing one or more suggested actionable measures that in some contexts is executed to address one or more events impacting the operation of a vehicle to revert the vehicle from a problem state back into a steady (e.g., nominal) state. In some embodiments, a corrective action embodies model output generated by the rules engine. Corrective actions in some contexts are configured to be human-readable and is rendered via a respective electronic interface associated with one or more computing devices such as, for example a CVMP vehicle apparatus associated with the vehicle and/or a CVMP offboard apparatus associated with the CVMP centralized services. In various embodiments, corrective actions are executed automatically by the onboard vehicle monitoring system. In various other embodiments, the corrective actions in some contexts are confirmed by an operator of the vehicle, where confirmation is a selection indication associated with the corrective actions generated via one or more computing devices and where the confirmation causes execution of the corrective actions. Executing a corrective action comprises operating one or more systems associated with the vehicle to control the operation of the vehicle. In some embodiments, the execution of a corrective action must be confirmed via a computing device (e.g., a CVMP vehicle apparatus or a CVMP offboard apparatus). In various other embodiments, corrective actions in some contexts are automatically executed depending on the criticality of the corresponding event impacting the operation of the vehicle.

"Rule" refers to electronically managed data and/or computer code instructions representing an operational constraint, limit, parameter threshold, guideline, and/or the like that in some contexts is defined to govern one or more operation(s), system(s), component(s), and/or environment(s) associated with a particular vehicle. In various embodiments, rules in some contexts are related to a specific domain of applicable knowledge (e.g., the aerospace domain). In various embodiments, rules in some contexts are defined, generated, updated, selected, retrieved, and/or otherwise processed by the federated learning model of the CVMP centralized services and transmitted to the onboard vehicle monitoring system associated with the particular vehicle. Based in part on one or more rules associated with the particular vehicle, the rules engine, in conjunction with the vehicle state evaluation model, can determine whether one or more rules have been violated or satisfied by one or more vehicle system(s) and/or an environment associated with the vehicle.

In various embodiments, a rule defines a threshold data value and/or data range which in some contexts is used to determine whether a particular rule has been violated, satisfied, exceeded, and/or otherwise triggered. As a non-limiting example, a rule defines a threshold (e.g., a particular data value and/or data range) for a safe operating temperature associated with one or more engine components. If the onboard vehicle monitoring system determines (e.g., via the vehicle state evaluation model and/or the rules engine) that the one or more engine components have exceeded the threshold associated with the safe operating temperature (and therefore violated the corresponding rule), the onboard vehicle monitoring system can execute one or more corrective actions associated with the rule that was violated. For example, the onboard vehicle monitoring system causes execution (e.g., via the rules engine and/or the CVMP vehicle apparatus) of one or more corrective actions to correct the operating temperatures by reconfiguring one or more operational parameters associated with the one or more engine components.

"Steady state" refers to electronically managed data representing a nominal operational state associated with a particular vehicle in which the vehicle is operating as intended or desired. A steady state in some contexts is understood to mean that a vehicle, the one or more vehicle system(s) associated with the vehicle, and any crew members and/or passengers associated with the vehicle are operating as expected. Data related to a steady state in some contexts is logged, stored, and/or otherwise saved (e.g., captured as a contextual data snapshot by the vehicle state evaluation model) such that any data values associated with one or more current operational configuration parameters related to the one or more vehicle system(s) are stored as well as how the configuration of the one or more current operational configuration parameters relates to the current nominal operation of the vehicle. A stored steady state associated with a particular vehicle in some contexts is used in one or more data recovery operations associated with the particular vehicle. For example, if the onboard vehicle monitoring system has mitigated one or more events impacting the vehicle by executing one or more corrective actions, the stored steady state can then be used to re-initialize, reconfigure and/or otherwise update the one or more vehicle system(s) such that the vehicle reverts to operating nominally in the steady state. Furthermore, one or more portions of data related to a steady state in some contexts is configured and/or transmitted to the CVMP centralized services as event mitigation data and used for training, re-training, and/or otherwise updating the federated learning model associated with the CVMP centralized services.

"Problem state" refers to electronically managed data representing an adverse operational state associated with a particular vehicle. A problem state in some contexts is understood to mean that a vehicle, the one or more vehicle system(s) associated with the vehicle, and any crew members and/or passengers associated with the vehicle are not operating as expected. Additionally, a problem state in some contexts is an operational state of a vehicle being impacted by one or more events. For example, a problem state in some contexts is a situation in which the vehicle is experiencing an emergency scenario, a hazard scenario, and/or a scenario that is altering the voyage of the vehicle. One or more events, mechanical failures, and/or environmental factors in some contexts contribute to a particular problem state. Data related to a problem state in some contexts is logged, stored, and/or otherwise saved (e.g., captured as a contextual data snapshot by the vehicle state evaluation model) such that any data values associated with one or more current operational configuration parameters related to the one or more vehicle system(s) are stored as well as how the configuration of the one or more current operational configuration parameters relates to the current nominal operation of the vehicle. Additionally, data related to how an event and/or scenario is adversely impacting the one or more vehicle system(s) in some contexts is also stored. Furthermore, one or more portions of data related to a problem state in some contexts is configured and/or transmitted to the CVMP centralized services as event mitigation data and used for training, re-training, and/or otherwise updating the federated learning model associated with the CVMP centralized services.

"Aerial vehicle" refers to any manned or unmanned vehicle capable of air travel. Non-limiting examples of an aerial vehicle include a passenger airplane, a helicopter, an unmanned aerial vehicle, an electronic vertical takeoff or landing (eVTOL) aircraft, a jet, a drone, or a quadcopter. At least some aerial vehicles are controllable by system(s) onboard the aerial vehicle. At least some aerial vehicles are controllable by system(s) external from the aerial vehicle including, and without limitation, remote control system(s), ground system(s), and centralized control system(s).

"Computing device" refers to any computer, processor, circuitry, and/or other executor of computer instructions that is embodied in hardware, software, firmware, and/or any combination thereof. Non-limiting examples of a computing device include a computer, a processor, an application-specific integrated circuit, a field-programmable gate array, a personal computer, a smart phone, a laptop, a fixed terminal, a server, a networking device, and a virtual machine.

"User computing device" refers to a computing device associated with a person, company, or other organizational structure that controls one or more systems. In some embodiments, a user computing device is associated with particular administrative credentials that define access to operation via a particular system.

"Executable code" refers to a portion of computer program code stored in one or a plurality of locations that is executed and/or executable via one or more computing devices embodied in hardware, software, firmware, and/or any combination thereof. Executable code defines at least one particular operation to be executed by one or more computing devices. In some embodiments, a memory, storage, and/or other computing device includes and/or otherwise is structured to define any amount of executable code (e.g., a portion of executable code associated with a first operation and a portion of executable code associated with a second operation). Alternatively or additionally, in some embodiments, executable code is embodied by separate computing devices (e.g., a first data store embodying first portion of executable code and a second data store embodying a second portion executable code).

"Data store," "database," and "data lake" refer to any type of non-transitory computer-readable storage medium. Non-limiting examples of a data store, database, and/or data lake include hardware, software, firmware, and/or a combination thereof capable of storing, recording, updating, retrieving and/or deleting computer-readable data and information. In various embodiments, a data store, database, and/or data lake in some contexts is a cloud-based storage system accessible via a communications network by one or more components of the various embodiments of the present disclosure.

"Data attribute" refers to electronically managed data representing a variable or particular criteria or property having a particular value or status. In some contexts the value is statically fixed or dynamically assigned. In some embodiments, a data attribute embodies a particular property of a data object.

"Data value" refers to electronically managed data representing a particular value for a particular data attribute, operational parameter, sensor device, and/or the like.

The phrases "in an embodiment," "in one embodiment," "according to one embodiment," and the like generally mean that the particular feature, structure, or characteristic following the phrase in some contexts is included in at least one embodiment of the present disclosure, and in some contexts is included in more than one embodiment of the present disclosure (importantly, such phrases do not necessarily refer to the same embodiment). The word "exemplary" is used herein to mean "serving as an example, instance, or illustration." Any implementation described herein as "exemplary" is not necessarily to be construed as preferred or advantageous over other implementations. If the specification states a component or feature "can," "may," "could," "should," "would," "preferably," "possibly," "typically," "optionally," "for example," "often," or "might" (or other such language) be included or have a characteristic, that particular component or feature is not required to be included or to have the characteristic. Such component or feature in some contexts is optionally included in some embodiments, or it in some contexts is excluded.

As used herein, the terms "data," "content," "digital content," "data object," "information," and similar terms may be used interchangeably to refer to data capable of being transmitted, received, and/or stored in accordance with embodiments of the present invention. Thus, use of any such terms should not be taken to limit the spirit and scope of embodiments of the present invention. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to another computing device or may be sent indirectly via one or more intermediary computing devices, such as, for example, one or more servers, relays, routers, network access points, base stations, hosts, and/or the like.

Example Systems, Apparatuses, and Dataflows of the Disclosure

FIG. 1 illustrates an example system that enables vehicle management for one or more vehicles associated with a cloud-based vehicle monitoring platform (CVMP) in accordance with at least some example embodiments of the present disclosure. Specifically, FIG. 1 depicts an example system 100 within which embodiments of the present disclosure may operate to mitigate one or more events impacting the operation of an aerial vehicle 112. As depicted, the system 100 includes an aerial vehicle onboard system(s) 102 associated with the aerial vehicle 112. Additionally or alternatively, in some embodiments, the aerial vehicle 112 is communicable (e.g., via the aerial vehicle onboard system(s) 102) with one or more external computing device(s) and/or system(s). For example, in some embodiments, the aerial vehicle onboard system(s) 102 is optionally communicable with some or all of the other connected vehicle system(s) 104, travel operation management system(s) 106, and/or environment data system(s) 108. In some such embodiments, the aerial vehicle onboard system(s) 102 communicates with the other connected vehicle system(s) 104, travel operation management system(s) 106, and/or environment data system(s) 108 via one or more specially configured communications network(s), for example the network 110.

In some embodiments, the aerial vehicle onboard system (s) 102 includes any number of computing device(s) and/or system(s) embodied in hardware, software, firmware, and/or a combination thereof, that control, operate, and/or otherwise function onboard an aerial vehicle 112. For example, in some embodiments, the aerial vehicle onboard system(s) 102 includes one or more physical component(s) of the aerial vehicle 112, including and without limitation one or more display(s), flight management system(s), travel operation management system(s), engine(s), wing(s), prop(s), motor(s), antenna(s), landing gear(s), and/or the like. In some embodiments, the aerial vehicle onboard system(s) 102 includes one or more sensor(s) that gather, collect, and/or otherwise aggregates sensor data relevant to operation of the aerial vehicle 112, associated with the aerial vehicle 112, and/or otherwise associated with an environment of the aerial vehicle 112.

Additionally or alternatively, in some embodiments, the aerial vehicle onboard system(s) 102 includes one or more computing device(s) and/or system(s) embodied in hardware, software, firmware, and/or a combination thereof, that control(s) operation of one or more physical components of the aerial vehicle 112. For example and without limitation, in some embodiments the aerial vehicle onboard system(s) 102 includes computing device(s) and/or system(s) that control one or more display(s), flight management system(s), travel operation management system(s), engine(s), wing(s), prop(s), motor(s), antenna(s), landing gear(s), sensor(s), and/or the like.

Additionally or alternatively, in some embodiments, the aerial vehicle onboard system(s) 102 includes one or more computing device(s) and/or system(s) embodied in hardware, software, firmware, and/or a combination thereof, that generates and/or otherwise causes rendering of one or more user interface(s) renderable to one or more display(s) onboard and/or otherwise associated with the aerial vehicle 112. In some embodiments such computing device(s) and/or system(s) specially configure some or all element(s) of user interface(s) to be rendered based at least in part on received data. It should be appreciated that the aerial vehicle onboard system(s) 102 in some embodiments includes any of a myriad of specially configured computing device(s) and/or system(s) that enable the aerial vehicle 112 to operate in a particular manner of airborne travel.

In some embodiments, the aerial vehicle onboard system(s) 102 includes one or more personal computer(s), end-user terminal(s), monitor(s) or other display(s), and/or the like. Additionally or alternatively, in some embodiments, the aerial vehicle onboard system(s) 102 includes one or more data repository/data repositories embodied in hardware, software, firmware, and/or any combination thereof, to support functionality provided by the aerial vehicle onboard system(s) 102. For example, in some embodiments, such data repositories provide data storage functionality on the same computing device(s) and/or other dedicated computing device(s) of the aerial vehicle onboard system(s) 102. Additionally or alternatively still, in some embodiments, the aerial vehicle onboard system(s) 102 includes one or more specially configured integrated system(s), circuit(s), and/or the like that process data received by and/or control one or more other computing device(s) and/or system(s), or physical component(s), associated with the aerial vehicle 112.

The aerial vehicle 112 may embody any of a myriad of aerial vehicle types. The aerial vehicle 112 includes any number of physical component(s) that enable air travel, including and without limitation prop(s), rotor(s), engine(s), wing(s), and/or the like. Additionally or alternatively, the aerial vehicle 112 includes any number of a myriad of controls for operating the physical components of the aerial vehicle 112 to achieve such airborne travel. For example, in some embodiments, the aerial vehicle 112 includes a forward-flying aerial vehicle. In some embodiments, the aerial vehicle 112 includes a vertical takeoff and landing aerial vehicle. It will be appreciated that the aerial vehicle 112 may be entirely manually controlled, semi-autonomous, fully autonomous for one or more operations, or any combination thereof. Non-limiting examples of an aerial vehicle 112 include a plane generally, a helicopter, a drone, an electric vertical takeoff and landing aircraft (eVTOL), a prop-based aircraft, a jet, and/or the like. Any particular vehicle type utilized in this disclosure is purely illustrative, and not to limit the scope and/or spirit of this disclosure or the appended claims presented herewith.

The other connected vehicle system(s) 104 includes computing device(s), system(s), and/or onboard system(s) of other vehicle(s) communicatively coupled with the aerial vehicle 112 associated with aerial vehicle onboard system(s) 102. It will be appreciated that the other connected vehicle system(s) 104 in some embodiments includes computing device(s) and/or system(s) of one or more other aerial vehicle(s) of the same type operating within the same environment as the aerial vehicle associated with aerial vehicle onboard system(s) 102. For example, in some embodiments some of the other connected vehicle system(s) 104 include computing device(s) and/or system(s) of other aerial vehicle(s) in a fleet of a particular type of aerial vehicle. In some such embodiments, sensor data (for example) captured via such other connected vehicle system(s) 104 similarly may be applicable to the aerial vehicle 112 as well. Additionally or alternatively, in some embodiments, the other connected vehicle system(s) 104 includes computing device(s) and/or system(s) of ground vehicle(s), other types of aerial vehicle(s), and/or the like, or any combination thereof.

In some embodiments, the aerial vehicle onboard system(s) 102 receives data from one or more of the other connected vehicle system(s) 104 that provides additional context with respect to the environment in which the aerial vehicle 112 associated with aerial vehicle onboard system(s) 102 is operating. In some contexts, such data includes sensor data that the aerial vehicle onboard system(s) 102 is able to capture, or in some embodiments includes sensor data not capturable by the aerial vehicle onboard system(s) 102. For example, in some embodiments, the aerial vehicle onboard system(s) 102 communicates with the other connected vehicle system(s) 104 to determine a position of other aerial vehicle(s), object(s), environmental feature(s) (e.g., buildings, terrain, and/or the like) within the environment of the aerial vehicle associated with aerial vehicle onboard system(s) 102, and/or the like. Additionally or alternatively, in some embodiments, the aerial vehicle onboard system(s) 102 communicate with one or more of the other connected vehicle system(s) 104 to receive sensor data of a particular data type that is not capturable directly by the aerial vehicle onboard system(s) 102. For example, in some embodiments, the aerial vehicle associated with the aerial vehicle onboard system(s) 102 does not include a particular sensor for capturing a particular type of sensor data, and instead receives such data of the particular data type from the other connected vehicle system(s) 104.

In some embodiments, the travel operation management system(s) 106 includes one or more computing device(s) embodied in hardware, software, firmware, and/or the like that generate, assign, and/or maintain vehicle operation constraints (e.g., flight plan information, mission goals, etc.) for one or more aerial vehicle(s). For example, in some embodiments, the travel operation management system(s) 106 include computing device(s) and/or system(s) of an air traffic control system and/or other authoritative entity that assigns flight plan information to one or more aerial vehicle(s). Such information includes, without limitation, flight plan information embodying a visual sight rules (VFR) flight plan, an instrument flight rules (IFR) flight plan, a composite flight plan, and/or the like defining conditions for operating an aerial vehicle 112 within a particular environment. In some embodiments, the travel operation management system(s) 106 captures and/or otherwise obtains particular data for relaying to the aerial vehicle 112.

In some embodiments, the travel operation management system(s) 106 includes one or more application server(s), end user terminal(s), personal computer(s), mobile device (s), user device(s), and/or the like that generate, assign, and/or transmit flight plan information to aerial vehicle(s). Additionally or alternatively, in some embodiments, the travel operation management system(s) 106 includes one or more data repository/repositories embodied in hardware, software, firmware, and/or a combination thereof, that stores flight plan information, links between flight plan information and particular aerial vehicle(s), and/or the like. In some such embodiments, the flight plan information includes navigational data, environmental data, weather data, and/or obstacle data for one or more environment(s) within which an aerial vehicle is or will be operating. Additionally or alternatively, in some embodiments, the travel operation management system(s) 106 includes one or more computing device(s) and/or system(s) that detect and/or monitor operation of one or more aerial vehicle(s) within an environment. For example, in some embodiments, the travel operation management system (s) 106 includes one or more radar system(s) that monitor one or more environment(s).

The environment data system(s) 108 includes one or more computing device(s) and/or system(s) that monitor, capture, and/or otherwise store data representing one or more aspect (s) of a real-world environment, object(s) therein, and/or aerial vehicle(s) therein. In some embodiments, the environment data system(s) 108 includes one or more data repository/repositories that store weather and/or obstacle data for one or more environment(s). Additionally or alternatively, in some embodiments, the environment data system(s) 108 includes one or more data repository/repositories that store data embodying other environmental aspect(s) that interact with or otherwise affect operation of aerial vehicle (s) in an environment, for example the aerial vehicle 112. In some embodiments, the environment data system(s) 108 includes a satellite system that monitors one or more aspect (s) of an environment, for example a satellite weather provider and/or satellite radio provider to the aerial vehicle 112. Alternatively or additionally still, in some embodiments, the environment data system(s) 108 embody or include a flight services data provider system (e.g., a Honeywell flight services system). In some embodiments, the environment data system(s) 108 embodies a subsystem of the travel operation management system(s) 106 and/or other connected vehicle system(s) 104.

In some embodiments, the environment data system(s) 108 includes one or more application server(s), end user terminal(s), personal computer(s), mobile device(s), user device(s), and/or the like. Additionally or alternatively, in some embodiments, the environment data system(s) 108 includes one or more database server(s) specially configured to store data pushed from one or more other computing device(s) and/or system(s). In some embodiments, the environment data system(s) 108 includes one or more remote and/or cloud computing device(s) accessible to the aerial vehicle onboard system(s) 102, other connected vehicle system(s) 104, and/or travel operation management system (s) 106 over a communications network, such as the network 110.

In some embodiments the network 110 enables communication between various computing device(s) and/or system (s) utilizing one or more combination(s) of wireless and/or wired data transmission protocol(s). In this regard, the network 110 in some contexts embodies any of a myriad of network configurations. In some embodiments, the network 110 embodies a public network (e.g., the Internet) in whole or in part. In some embodiments, the network 110 embodies a private network (e.g., an internal network between particular computing devices) in whole or in part. Alternatively or additionally, in some embodiments the network 110 embodies a direct or private connection facilitated over satellite or radio system(s) that enables long-range communication between aerial vehicle(s) and corresponding grounded system(s). In some other embodiments, the network 110 embodies a hybrid network (e.g., a network enabling internal communications between particular connected computing devices and external communications with other computing devices). The network 110 in some embodiments includes one or more base station(s), relay(s), router(s), switch(es), cell tower(s), communications cable(s), satellite(s), radio antenna(s) and/or related control system(s), and/or associated routing station(s), and/or the like. In some embodiments, the network 110 includes one or more user entity-controlled computing device(s) and/or other enterprise device(s) (e.g., an end-user's or enterprise router, modem, switch, and/or other network access point) and/or one or more external utility devices (e.g., Internet service provider communication tower(s), cell tower(s), and/or other device(s)). In some embodiments, the aerial vehicle onboard system(s) 102 communicates with one or more of the other connected vehicle system(s) 104, travel operation management system(s) 106, environment data system(s) 108 over the network 110 to receive and/or transmit the data described herein for generating the user interface(s) for providing to one or more display(s) of an aerial vehicle. In some embodiments, the network 110 embodies a Datalink uplink to the aerial vehicle 112 (e.g., via the aerial vehicle onboard system(s) 102) that communicatively couple the airborne system(s) to the ground system(s).

Figure 2:
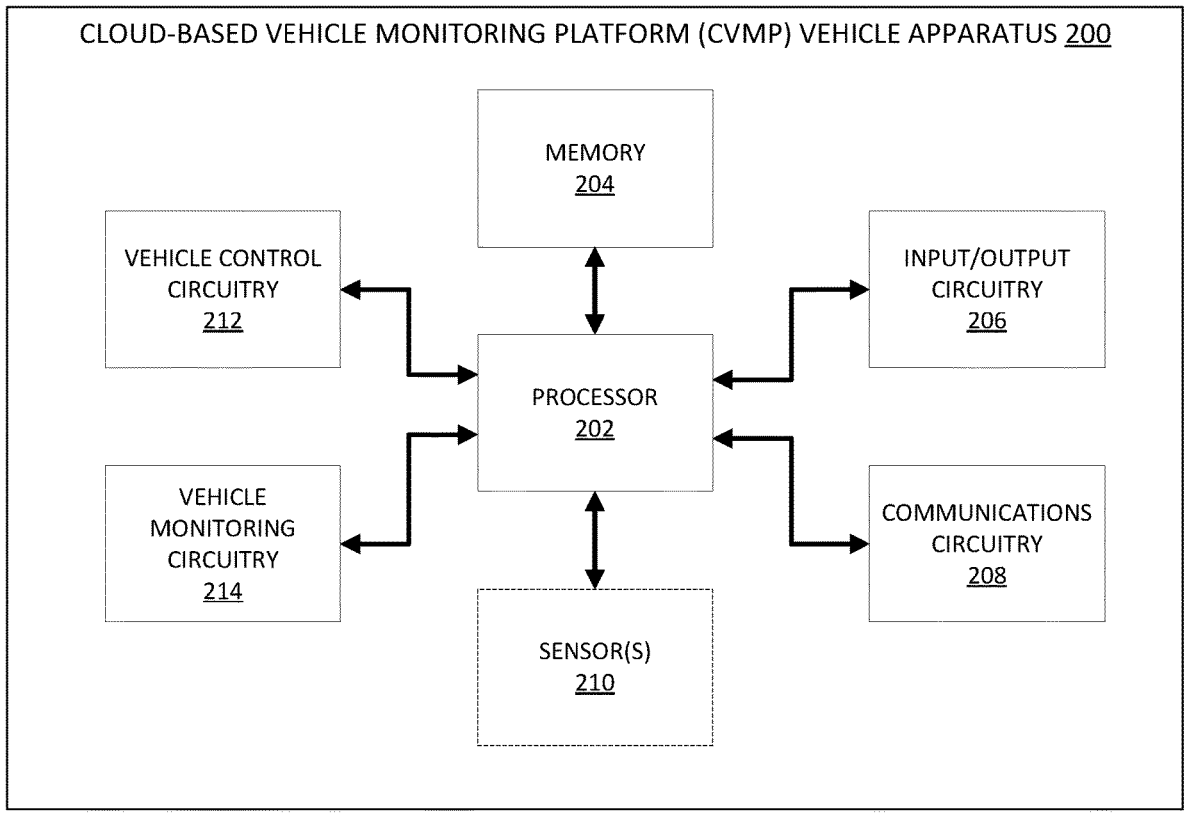
FIG. 2 illustrates an example CVMP vehicle apparatus in accordance with at least some example embodiments of the present disclosure.

FIG. 2 illustrates an example CVMP vehicle apparatus in accordance with at least some example embodiments of the present disclosure. Specifically, FIG. 2 depicts a CVMP vehicle apparatus 200. In some embodiments, one or more computing device(s) and/or system(s) of a vehicle (e.g., an aerial vehicle 112), for example included in or embodied by the aerial vehicle onboard system(s) 102 onboard an aerial vehicle 112, is embodied by one or more computing devices such as the CVMP vehicle apparatus 200 as depicted and described in FIG. 2. As depicted, the CVMP vehicle apparatus 200 includes a processor 202, memory 204, input/output circuitry 206, communications circuitry 208, sensor(s) 210, vehicle control circuitry 212, and/or vehicle monitoring circuitry 214. In some embodiments, the CVMP vehicle apparatus 200 is configured, using one or more of the sets of circuitry embodying processor 202, memory 204, input/output circuitry 206, communications circuitry 208, sensor(s) 210, vehicle control circuitry 212, and/or vehicle monitoring circuitry 214, to execute one or more operations described herein.

Although components are described with respect to functional limitations, it should be understood that the particular implementations necessarily include the use of particular computing hardware. It should also be understood that in some embodiments certain of the components described herein include similar or common hardware. For example, two sets of circuitry may both leverage use of the same processor(s), network interface(s), storage medium(s), and/or the like, to perform their associated functions, such that duplicate hardware is not required for each set of circuitry. The use of the term "circuitry" as used herein with respect to components of the apparatuses described herein should therefore be understood to include particular hardware configured to perform the functions associated with the particular circuitry as described herein.

Particularly, the term "circuitry" should be understood broadly to include hardware and, in some embodiments, software for configuring the hardware. For example, in some embodiments, "circuitry" includes processing circuitry, storage media, network interfaces, input/output devices, and/or the like. Alternatively or additionally, in some embodiments, other elements of the CVMP vehicle apparatus 200 provide or supplement the functionality of another particular set of circuitry. For example, the processor 202 in some embodiments provides processing functionality to any of the other sets of circuitry, the memory 204 provides storage functionality to any of other the sets of circuitry, the communications circuitry 208 provides network interface functionality to any of the other sets of circuitry, and/or the like.

In some embodiments, the processor 202 (and/or coprocessor or any other processing circuitry assisting or otherwise associated with the processor) is/are in communication with the memory 204 via a bus for passing information among components of the CVMP vehicle apparatus 200. In some embodiments, for example, the memory 204 is non-transitory and includes for example, one or more volatile and/or non-volatile memories. In other words, for example, the memory 204 in some embodiments includes or embodies an electronic storage device (e.g., a computer readable storage medium). In some embodiments, the memory 204 is configured to store information, data, content, applications, instructions, or the like, for enabling the CVMP vehicle apparatus 200 to carry out various functions in accordance with example embodiments of the present disclosure.

In various embodiments, the processor 202 is embodied in a number of different ways. For example, in some example embodiments, the processor 202 includes one or more processing devices configured to perform independently. Additionally or alternatively, in some embodiments, the processor 202 includes one or more processor(s) configured in tandem via a bus to enable independent execution of instructions, pipelining, and/or multithreading. The use of the terms "processor" and "processing circuitry" should be understood to include a single core processor, a multi-core processor, multiple processors internal to the CVMP vehicle apparatus 200, and/or one or more remote or "cloud" processor(s) external to the CVMP vehicle apparatus 200.

In an example embodiment, the processor 202 is configured to execute instructions stored in the memory 204 or otherwise accessible to the processor 202. Alternatively or additionally, the processor 202 in some embodiments is configured to execute hard-coded functionality. As such, whether configured by hardware or software methods, or by a combination thereof, the processor 202 represents an entity (e.g., physically embodied in circuitry) capable of performing operations according to an embodiment of the present disclosure while configured accordingly. Alternatively or additionally, as another example in some example embodiments, when the processor 202 is embodied as an executor of software instructions, the instructions specifically configure the processor 202 to perform the algorithms embodied in the specific operations described herein when such instructions are executed.

As one particular example embodiment, the processor 202 is configured to perform various operations associated with executing one or more corrective actions generated by the rules engine associated with the onboard vehicle monitoring system, for example as described with respect to operating and/or reconfiguring the aerial vehicle onboard system(s) 102 in FIG. 1 and/or as described further herein. In some embodiments, the processor 202 includes hardware, software, firmware, and/or a combination thereof, that receives data including one or more portions of vehicle operation data, vehicle sensor data, environmental data, logistical data, and/or data related to one or more events impacting the operation of the aerial vehicle 112. Additionally or alternatively, in some embodiments, the processor 202 includes hardware, software, firmware, and/or a combination thereof, that causes rendering one or more corrective actions generated by the rules engine via one or more electronic interfaces associated with the CVMP vehicle apparatus 200 and/or one or more electronic interfaces associated with other computing devices related to the CVMP (e.g., a CVMP offboard apparatus associated with the CVMP centralized services). Additionally or alternatively, in some embodiments, the processor 202 includes hardware, software, firmware, and/or a combination thereof, that in real-time updates rendering of a user interface and/or interface element(s) thereof in response to updated data related to the one or more events, one or more corrective actions associated with the one or more events, and/or one or more portions of data associated with the operation of the aerial vehicle 112.

In some embodiments, the CVMP vehicle apparatus 200 includes input/output circuitry 206 that provides output to the user and, in some embodiments, to receive an indication of a user input (e.g., user input generated by a pilot, operator, crew member, and/or passenger). In some embodiments, the input/output circuitry 206 is in communication with the processor 202 to provide such functionality. The input/output circuitry 206 in some contexts comprises one or more user interface(s) and in some embodiments includes a display that comprises the interface(s) rendered as a web user interface, an application user interface, a user device, a backend system, or the like. In some embodiments, the input/output circuitry 206 also includes a keyboard, a mouse, a joystick, a touch screen, touch areas, soft keys a microphone, a speaker, or other input/output mechanisms. The processor 202, and/or input/output circuitry 206 comprising a processor, in some embodiments is configured to control one or more functions of one or more user interface elements through computer program instructions (e.g., software and/or firmware) stored on a memory accessible to the processor 202 (e.g., memory 204, and/or the like). In some embodiments, the input/output circuitry 206 includes or utilizes a user-facing application to provide input/output functionality to a service maintainer device and/or other display associated with a user. In some embodiments, the input/output circuitry 206 includes a primary flight display and/or a multi-function display of an aerial vehicle. Additionally or alternatively, in some embodiments, the input/output circuitry 206 includes one or more software-rendered user interface(s) including interface element(s) that depict particular data and/or information, and/or that receive user input.

The communications circuitry 208 includes any means such as a device or circuitry embodied in either hardware or a combination of hardware and software that is configured to receive and/or transmit data from/to a communications network and/or any other computing device, circuitry, or module in communication with the CVMP vehicle apparatus 200. In this regard, the communications circuitry 208 includes, for example in some embodiments, a network interface for enabling communications with a wired or wireless communications network. Additionally or alternatively in some embodiments, the communications circuitry 208 includes one or more network interface card(s), antenna(s), bus(es), switch(es), router(s), modem(s), and supporting hardware, firmware, and/or software, or any other device suitable for enabling communications via one or more communications network(s). Additionally or alternatively, the communications circuitry 208 includes circuitry for interacting with the antenna(s) and/or other hardware or software to cause transmission of signals via the antenna(s) or to handle receipt of signals received via the antenna(s). In some embodiments, the communications circuitry 208 enables transmission to and/or receipt of data from one or more computing device(s) and/or system(s) of other connected vehicle system(s) 104, travel operation management system(s) 106, and/or environment data system(s) 108, in communication with the CVMP vehicle apparatus 200.

The sensor(s) 210 includes hardware, software, firmware, and/or a combination thereof, that supports generation, capturing, aggregating, retrieval, and/or receiving of one or more portions of sensor data. In some embodiments, the sensor(s) 210 includes one or more discrete component(s) of a vehicle (e.g., an aerial vehicle 112). The sensor(s) 210 in some embodiments are affixed to, within, and/or otherwise as a part of an aerial vehicle including or otherwise associated with the CVMP vehicle apparatus 200. For example, in some embodiments, one or more of the sensor(s) 210 is/are mounted to the aerial vehicle, such as the aerial vehicle 112. Non-limiting examples of sensor(s) 210 include altimeter(s) (e.g., radio and/or barometric), pressure sensor(s), pilot tube(s), anemometer(s), image camera(s), video camera(s), infrared sensor(s), speed sensor(s), battery sensor(s), fuel level sensor(s), biological sensor(s) and/or the like. In some embodiments, the sensor(s) 210 are integrated with, or embodied by, one or more of the aerial vehicle onboard system(s) 102 such that the sensor(s) 210 generate, collect, monitors, and/or otherwise obtain data related to the one or more aerial vehicle onboard system(s) 102.

In some embodiments, the sensor(s) 210 additionally or alternatively include any of a myriad of sensor(s) conventionally associated with drone(s), helicopter(s), and/or other urban air mobility aerial vehicle(s). Additionally or alternatively, in some embodiments, the sensor(s) 210 include one or more high-sensitivity sensor(s) to facilitate enable high accuracy capturing of data in certain circumstances. For example, in some embodiments, the sensor(s) 210 includes one or more high-sensitivity sensor(s) that capture detailed data while an aerial vehicle is in flight. Such higher fidelity sensor(s) in some contexts supplement and/or, in other embodiments, replace the data captured by such sensor(s) with lower fidelity.

In some embodiments, the sensor(s) 210 includes hardware, software, firmware, and/or a combination thereof, embodying one or more navigation sensor(s). In some embodiments, the navigation sensor(s) includes a global positioning satellite (GPS) tracking chip and/or the like enabling location services to be requested and/or determined for a particular aerial vehicle. Additionally or alternatively, in some embodiments, the sensor(s) 210 includes hardware, software, firmware, and/or any combination thereof, embodying inertial navigation sensor(s) that measures speed, acceleration, orientation, and/or position-related data in a 3D environment. Additionally or alternatively, in some embodiments, the sensor(s) 210 includes one or more camera(s) associated with a synthetic vision system (SVS). In some such embodiments, such an SVS camera captures image data representation(s) of the real-world environment around an aerial vehicle for use in generating corresponding user interface(s) depicting he captured image data, augmenting such image data, and/or otherwise providing data to enable an operator to acquire situational awareness based at least in part on the captured image data. It will be appreciated that, in some embodiments, the sensor(s) 210 includes a separate processor, specially configured field programmable gate array (FPGA), or a specially programmed application specific integrated circuit (ASIC).

The vehicle control circuitry 212 includes hardware, software, firmware, and/or a combination thereof, that supports functionality associated with navigating and/or controlling a vehicle (e.g., an aerial vehicle 112). In some embodiments, vehicle control circuitry 212 can control and/or configure one or more of the aerial onboard system(s) 102. In some embodiments, vehicle control circuitry 212 includes hardware, software, firmware, and/or a combination thereof, that receives flight detail data (e.g., embodying a flight plan), location service(s) data representing a location of an aerial vehicle 112, and/or the like. Additionally or alternatively, in some embodiments, the vehicle control circuitry 212 includes hardware, software, firmware, and/or a combination thereof, that depicts interface element(s) representing at least a flight path or indication where the aerial vehicle 112 is currently traveling and/or should travel.

Additionally or alternatively, in some embodiments, the vehicle control circuitry 212 includes hardware, software, firmware, and/or a combination thereof, that autonomously control(s) one or more component(s) of an aerial vehicle. In some such embodiments, the vehicle control circuitry 212 autonomously control(s) one or more physical component(s) of a vehicle (e.g., an aerial vehicle 112) to facilitate movement of the vehicle along a particular path. Alternatively or additionally, in some embodiments, the vehicle control circuitry 212 includes hardware, software, firmware, and/or a combination thereof, that semi-autonomously control(s) one or more component(s) of an aerial vehicle, for example where certain aspects of the operation of the aerial vehicle are autonomously performed and others (e.g., directional control) is/are controlled by a user (e.g., a pilot). Alternatively or additionally, in some embodiments, the vehicle control circuitry 212 includes hardware, software, firmware, and/or a combination thereof, that receives pilot input for controlling one or more component(s) of an aerial vehicle, for example via vehicle flight control(s) to alter speed and/or direction of the aerial vehicle. Alternatively or additionally, in some embodiments, the vehicle control circuitry 212 includes hardware, software, firmware, and/or a combination thereof, that causes changes to an operational mode of an aerial vehicle, for example autonomously based at least in part on one or more data-driven event(s) and/or triggers, or in response to user input initiating the change in operational mode. It will be appreciated that, in some embodiments, the vehicle control circuitry 212 includes a separate processor, specially configured field programmable gate array (FPGA), or a specially programmed application specific integrated circuit (ASIC).

The vehicle monitoring circuitry 214 includes hardware, software, firmware, and/or a combination thereof, that supports functionality associated with the onboard vehicle monitoring system associated with a vehicle (e.g., an aerial vehicle 112). For example, the vehicle monitoring circuitry 214 executes, at least in part, one or more portions of program code associated with the methods and operations of the onboard vehicle monitoring system. For example, the vehicle monitoring circuitry 214 includes hardware, software, firmware, and/or a combination thereof, that can receive and/or analyze one or more portions of model input comprising rules associated with the federated learning model associated with the CVMP centralized services, vehicle operation data, vehicle sensor data, vehicle system data, air traffic data, environmental data, logistical data, personnel data, and/or any other relevant data related to a particular vehicle (e.g., an aerial vehicle 112). Additionally, in various embodiments, the vehicle monitoring circuitry 214 includes hardware, software, firmware, and/or a combination thereof, that in some contexts is employed to configure, update, train, and/or retrain the rules engine and/or vehicle state evaluation model associated with the onboard vehicle monitoring system based at least in part on prior model input comprising one or more prior rules associated with the federated learning model associated with the CVMP centralized services, prior events, one or more prior portions of prior vehicle operation data, one or more portions of prior vehicle sensor data, one or more prior operator inputs, one or more prior vehicle operation constraints, and/or a subset of the federated learning model. In this regard, the vehicle monitoring circuitry 214 includes hardware, software, firmware, and/or a combination thereof, that can cause the storage of one or more portions of data associated with the onboard vehicle monitoring system. Additionally or alternatively, the vehicle monitoring circuitry 214 includes hardware, software, firmware, and/or a combination thereof, that can interface with, control, configure, and/or otherwise operate one or more legacy vehicle systems, legacy software, and/or legacy hardware associated with a vehicle (e.g., an aerial vehicle 112) based at least in part on the model output (e.g., corrective actions) generated by the rules engine associated with the onboard vehicle monitoring system.

It will be appreciated that, further in some embodiments, two or more of the sets of circuitries 202-214 are combinable. Alternatively or additionally, in some embodiments, one or more of the sets of circuitry 202-214 perform some or all of the functionality described associated with another component. For example, in some embodiments, one or more of the sets of circuitry 202-214 are combined into a single component embodied in hardware, software, firmware, and/or a combination thereof. For example, in some embodiments, two or more of the vehicle control circuitry 212 and vehicle monitoring circuitry 214 are embodied by a single set of circuitry that performs the combined operations of the individual sets of circuitry. Similarly, in some embodiments, one or more of the sets of circuitry, for example vehicle control circuitry 212 and/or vehicle monitoring circuitry 214 is/are combined with the processor 202, such that the processor 202 performs one or more of the operations described above with respect to each of these other sets of circuitry.

Figure 3:
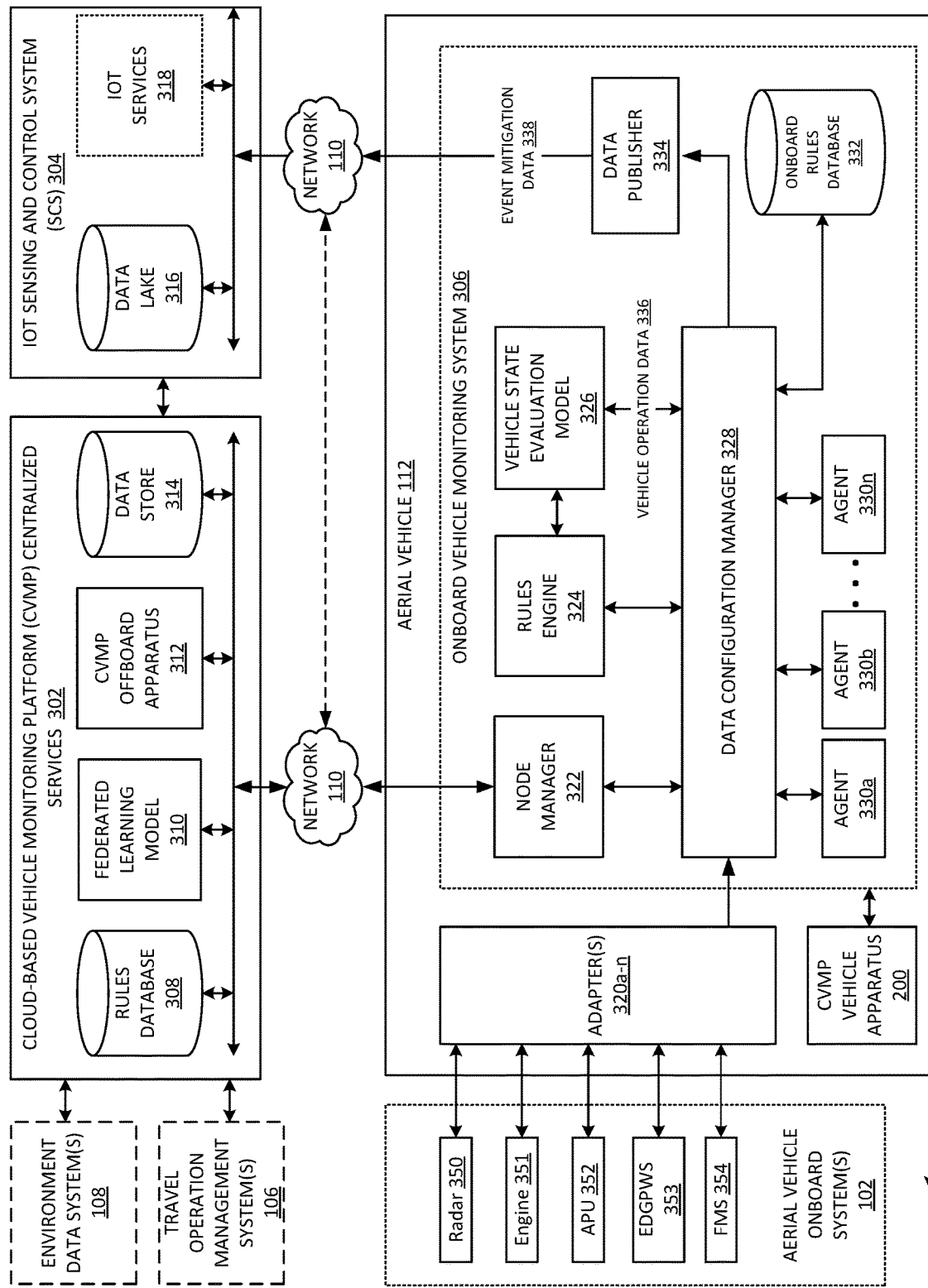
FIG. 3 illustrates an example CVMP in accordance with at least some example embodiments of the present disclosure.

FIG. 3 illustrates an example CVMP 300 in accordance with at least some example embodiments of the present disclosure. As depicted, FIG. 3 depicts the various operational services, systems, components, apparatuses, and data stores embodied by the CVMP 300. For example, the CVMP 300 includes CVMP centralized services 302 comprising a, rules database 308, a federated learning model 310, a CVMP offboard apparatus 312 and/or a data store 314. In various embodiments, the CVMP centralized services 302 integrates with, or is embodied by, an IoT SCS 304 which comprises a data lake 316 and IoT services 318. In various embodiments, the CVMP centralized services 302 also integrates and/or communicates with one or more environment data system(s) 108 and/or one or more travel operation management system(s) 106. In various embodiments, the CVMP centralized services 302, IoT SCS 304, environment data system(s) 108 and/or the travel operation management system(s) 106 in some contexts communicate via the network 110.

The CVMP 300 also comprises an onboard vehicle monitoring system 306 embodied by the aerial vehicle 112. In various embodiments, the onboard vehicle monitoring system 306 in some contexts is integrates with, or is embodied by, the CVMP vehicle apparatus 200. In various embodiments, the CVMP centralized services 302 communicates with the onboard vehicle monitoring system 306 via the network 110. For example the CVMP centralized services 302 communicates with the onboard vehicle monitoring system 306 through one or more of the component parts of the CVMP offboard apparatus 312 (e.g., communications circuitry) and one or more component parts of the CVMP vehicle apparatus 200 (e.g., communications circuitry 208) via the network 110.

As will be further detailed below, due to the distributed nature of the various embodiments of the present disclosure, the CVMP 300 and the operational systems and/or services comprised therein in some contexts is configured to freely pass data via one or more communications networks (e.g., network 110) in order to optimally delegate one or more operations described herein to one or more respective computing devices associated with the CVMP 300. This delegation of operations provides the benefit of optimizing the capabilities of a particular vehicle (e.g., a particular aerial vehicle 112) based at least in part on the processing power associated with the particular vehicle. As will be appreciated, the delegation of certain methods, procedures, calculations, computations, configurations, predictions, and/or the like throughout the distributed operational systems and/or services of the CVMP 300 reduces the load on the aerial vehicle onboard system(s) 102 of the vehicle as well as the load on the computing devices (e.g., the CVMP offboard apparatus 312) of the CVMP centralized services 302.

The CVMP 300 comprises many data storage systems deployed in various configurations. As defined herein, database (e.g., rules database 308), data store (e.g., data store 314), and data lake (e.g., data lake 316) in some contexts is any type of non-transitory computer-readable storage medium. Non-limiting examples include hardware, software, firmware, and/or a combination thereof capable of storing, recording, updating, retrieving and/or deleting computer-readable data and information related to the CVMP 300. In various embodiments, a database (e.g., rules database 308), a data store (e.g., data store 314), and/or a data lake (e.g., data lake 316) in some contexts is a cloud-based storage system accessible via a communications network (e.g., the network 110) by one or more components of the various embodiments of the present disclosure.

The rules database 308 comprise one or more rules related to the management and operation of one or more vehicles (e.g., one or more aerial vehicle(s) 112 related to an enterprise). The one or more rules comprised in the rules database 308 are related to respective operational constraints, limits, parameter thresholds, guidelines, and/or the like that in some contexts is defined to govern one or more operation(s), system(s), component(s), and/or environment(s) associated with a particular vehicle (e.g., a particular aerial vehicle 112). In various embodiments, rules in some contexts are defined, generated, updated, selected, retrieved, and/or otherwise processed by the federated learning model 310 of the CVMP centralized services 302 and transmitted to the onboard vehicle monitoring system 306 associated with a particular aerial vehicle 112. One or more rules in the rules database 308 in some contexts is vehicle specific (e.g., based on the capacities and systems of a particular vehicle) as well as context specific (e.g., a rule defining safety thresholds for general vehicle operation parameters). Furthermore, the one or more rules in the rules database 308 in some contexts is crafted to configure, initialize, and/or otherwise update a rules engine (e.g., rules engine 324) associated with a particular vehicle (e.g., a particular aerial vehicle 112).

The federated learning model 310 refers to an ML model associated with the CVMP centralized services 302 that is configured to determine one or more rules to transmit to a particular vehicle (e.g., aerial vehicle 112) in response to a request generated by an onboard vehicle monitoring system 306 associated with the particular vehicle. In various embodiments, the federated learning model 310 in some contexts is configured as a deep learning neural network such as an artificial neural network, (ANN), recurrent neural network (RNN), convolutional neural network (CNN), and/or any other specialized deep learning neural network. Based on a request generated by an onboard vehicle monitoring system 306 associated with the particular vehicle, the federated learning model 310 generates, selects, retrieves, and/or otherwise determines one or more rules to transmit to the particular vehicle based on the request, where the one or more rules are configured to facilitate the mitigation of one or more respective events impacting the operation of the particular vehicle.

The federated learning model 310 in some contexts is iteratively retrained and/or otherwise updated based on data related to one or more vehicles associated with the CVMP 300 and/or data received from an IoT SCS 304 related to the CVMP 300. For example, the federated learning model 310 in some contexts is trained and/or retrained based in part on one or more portions of event mitigation data 338 related to one or more vehicles associated with one or more respective enterprises related to the CVMP 300. The event mitigation data 338 comprises data related to the one or more events that caused a particular vehicle to enter into a problem state and/or data related to one or more respective rules and/or corrective actions with which the onboard vehicle monitoring system 306 employed to mitigate the one or more events. In this way, the federated learning model 310 in some contexts is constantly updated based on a global corpus of event mitigation data 338 related to many vehicles associated with many respective enterprises. As such, the federated learning model 310 is consistently improving in both accuracy and efficiency when determining which rules to transmit to a particular vehicle based on one or more events impacting the operation of the particular vehicle. In certain embodiments, the federated learning model 310 is retrained and/or otherwise updated (e.g., by the CVMP offboard apparatus 312) on a predefined schedule such as, for example, daily, weekly, bi-weekly, monthly, and/or the like.

The event mitigation data 338 in some contexts is data related to one or more events that caused a particular vehicle to enter into a problem state from a steady state. Event mitigation data 338 also refers to data related to one or more respective rules and/or one or more respective corrective actions associated with the one or more respective rules that were employed to mitigate, correct, and/or otherwise address the one or more events impacting the operation of the particular vehicle. The event mitigation data 338 indicates whether the one or more respective rules and/or corrective actions associated with the rules were successful or unsuccessful in causing the particular vehicle to revert back into the steady state from the problem state.

The event mitigation data 338 in some contexts is used to train, retrain, and/or otherwise updated the federated learning model 310 associated with the CVMP centralized services 302. In some embodiments, transmitting the event mitigation data 338 to the CVMP centralized services 302 and/or the IoT SCS 304 causes automatic updating of the federated learning model 310. Additionally, the event mitigation data 338 in some contexts is transmitted to the CVMP centralized services 302 and/or the IoT SCS 304 (e.g., via a data publisher 334 associated with the onboard vehicle monitoring system 306) on a predefined schedule. For example, the onboard vehicle monitoring system 306 of a particular aerial vehicle 112 in some contexts causes the event mitigation data 338 to be transmitted to the CVMP centralized services 302 and/or the IoT SCS 304 every night the particular aerial vehicle 112 is parked and connected to a network 110 associated with the CVMP centralized services 302 and/or the IoT SCS 304.

In various embodiments, the one or more operations and/or functionalities provided by the federated learning model 310 in some contexts is executed, at least in part, by the CVMP offboard apparatus 312. The CVMP offboard apparatus 312 in some contexts is a computing apparatus deployed in many configurations, the details of which will be provided in the description of FIG. 4 which illustrates the various components of the CVMP offboard apparatus 312. The CVMP offboard apparatus 312 is configured to generate one or more interactive user interfaces for rendering on one or more electronic displays associated with the CVMP centralized services 302. For example, in some embodiments, the CVMP offboard apparatus 312 is configured to generate an interactive user dashboard comprising various interactive display elements representing data related to the CVMP 300, data related to one or more onboard vehicle monitoring system(s) 306, data related to one or more vehicles (e.g., one or more aerial vehicle(s) 112, data related to the IoT SCS 304, data related to the one or more system(s) integrated with the CVMP centralized services 302, data related the federated learning model 310, and/or data related to the one or more storage system(s) associated with the CVMP 300.

As such, the CVMP offboard apparatus 312, via the one or more interactive user interfaces, is configured to initialize, configure, update, modify, and/or otherwise set up an onboard vehicle monitoring system 306 associated with a particular vehicle (e.g., aerial vehicle 112). Additionally or alternatively, the CVMP offboard apparatus 312, via the one or more interactive user interfaces, is configured to initialize, configure, update, modify, and/or otherwise set up one or more components associated with a particular onboard vehicle monitoring system 306 such as, for example, the node manager 322, the rules engine 324, vehicle state evaluation model 326, the data configuration manager 328, the one or more agent(s) 330*a-n*, the onboard rules database 332, and/or the data publisher 334.

In various embodiments, the CVMP offboard apparatus 312 generates one or more onboard vehicle monitoring system templates. An onboard vehicle monitoring system template in some contexts is a generalized template used to initialize an onboard vehicle monitoring system 306 associated with a particular type (e.g., a particular make, model, and/or manufacturer) of vehicle (e.g., a particular type of aerial vehicle 112). In various embodiments, the onboard vehicle monitoring system template in some contexts is used in one or more initialization and/or data recovery operations executed by the CVMP centralized services 302. For example, an onboard vehicle monitoring system template and a contextual data snapshot corresponding to a steady state of a vehicle in some contexts is used to initialize, re-initialize, reboot, reconfigure, and/or otherwise update the onboard vehicle monitoring system 306 and/or one or more aerial vehicle onboard system(s) 102 associated with a particular vehicle (e.g., a particular aerial vehicle 112).

The data store 314 associated with the CVMP centralized services 302 in some contexts is configured to store, retrieve, configure, modify, and/or otherwise manage one or more portions of data related to the CVMP 300. For instance, the data store 314 in some contexts stores vehicle operation data 336, event mitigation data 338, one or more contextual data snapshots associated with one or more vehicles, and/or one or more portions of training data for training and/or re-training the federated learning model 310. Additionally, the data store 314 in some contexts stores one or more portions of data associated with the environment data system(s) 108 and/or the travel operation management system(s) 106.

Furthermore, the data store 314 is configured to store one or more portions of data related to one or more vehicles associated with a vehicle fleet related to the CVMP 300. For example, the data store 314 in some contexts stores one or more vehicle identifiers, vehicle load identifiers, vehicle component identifiers, onboard vehicle monitoring system identifiers, vehicle fleet data, vehicle mission data, and/or any other data pertinent to the one or more vehicles in a vehicle fleet associated with the CVMP 300. Additionally, the data store 314 can store one or more portions of personnel data related to one or more vehicle operators, vehicle pilots, vehicle crew members, ground crew members, management personnel, and/or passengers associated with the CVMP 300.

As described herein, the CVMP centralized services 302 in some contexts are integrated with, or embodied by, the IoT SCS 304 associated with the CVMP 300. The IoT SCS 304 in some contexts is a system for enterprise performance management that embodies one or more IoT services 318 that employ real-time accurate models and visual analytics to deliver intelligent actionable corrective actions and/or analytics for sustained peak performance of the enterprise. The IoT SCS 304 in some contexts is an extensible platform that is portable for deployment in any cloud or data center environment for providing an enterprise-wide, top-to-bottom view, displaying the status of vehicles, processes, assets, people, and/or safety. In various embodiments, the IoT SCS 304 in some contexts is an existing framework (e.g., cloud-based enterprise architecture) associated with a particular enterprise. In this regard, an IoT SCS 304 associated with the particular enterprise in some contexts hosts, embodies, integrates with, configures, and/or otherwise employs the CVMP centralized services 302 to manage a fleet of vehicles associated with the particular enterprise. As a non-limiting example, the IoT SCS 304 could be an existing framework associated with an industrial processing and manufacturing enterprise, where the IoT SCS 304 is configured to manage one or more industrial assets related to one or more industrial processes associated with the enterprise. In various embodiments, the IoT SCS 304 remains in constant communication with the CVMP centralized services 302 via one or more communications networks (e.g., the network 110).

In various embodiments the IoT services 318 are configured to manage, modify, edit, update, reconfigure, and/or otherwise process one or more portions of data related to the travel operation management system(s) 106 and/or the environmental data system(s) 108. For example, the IoT services 318 in some contexts is integrates with the travel operation management system(s) 106 and/or the environmental data system(s) 108 to process air traffic information, flight plan information, navigation information, weather information, obstacle information, flight logging information, oceanic logging information, radar system information, safety information, hazard information, flight restriction information, and/or the like. As such, the IoT SCS 304 in some contexts is configured to update, manage, configured, and/or transmit the aforementioned processed data for use by the CVMP centralized services 302 and/or the onboard vehicle monitoring system 306.

In various embodiments, the onboard vehicle monitoring system 306 comprises a node manager 322, a rules engine 324, a vehicle state evaluation model 326, a data configuration manager 328, one or more agent(s) 330a-n, an onboard rules database 332, and/or a data publisher 334.

The node manager 322 is configured to facilitate communications between the onboard vehicle monitoring system 306 and the CVMP centralized services 302 via the network 110. For example, the node manager 322 is configured to send one or more requests generated by the onboard vehicle monitoring system 306 to the CVMP centralized services 302 such as, for example, a request for one or more rules related to the management of the corresponding vehicle (e.g., the aerial vehicle 112). The node manager 322 is also configured to receive data from the CVMP centralized services 302 such as, for example, model output comprising rules generated by the federated learning model 310. The node manager 322 is configured to analyze, modify, append, and/or otherwise interpret header information related to the data transmissions between the CVMP centralized services 302 and the onboard vehicle monitoring system 306. For example, the header information in some contexts is comprises one or more portions of data related to the identity of a particular onboard vehicle monitoring system 306 and/or vehicle (e.g., an aerial vehicle 112), security data (e.g., hash data and/or security key data), data packet routing data, networking data, and/or the like.

The data configuration manager 328 is configured to be a dynamic communications bridge between the components of the onboard vehicle monitoring system 306 and the one or more aerial vehicle onboard system(s) 102 associated with a particular vehicle (e.g., a particular aerial vehicle 112). For example, the data configuration manager 328 in some contexts interfaces with one or more adapter(s) 320a-n configured to provide connections to one or more the one or more aerial vehicle onboard system(s) 102. In various embodiments, the adapter(s) 320a-n in some contexts is physical inputs coupled to a computing device (e.g., an LRU configured for the aerial vehicle 112) configured to interface with the one or more aerial vehicle onboard system(s) 102. Non-limiting examples of the one or more aerial vehicle onboard system(s) 102 include a radar system 350, an engine component interface 351, an auxiliary power unit (APU) 352, an enhanced ground proximity warning system (EGPWS) 353, a flight management system (FMS) 354, various radio systems, as well as one or more sensors 210 related to the vehicle (e.g., the aerial vehicle 112).

To enable the aggregation and configuration of raw data received from the one or more aerial vehicle onboard system(s) 102, the data configuration manager 328 embodies, or integrates with, one or more agent(s) 330a-n. The one or more agent(s) 330a-n are specially configured, independent portions of executable code configured to integrate with the one or more aerial vehicle onboard system(s) 102 in order to collect, compile, aggregate, and/or otherwise configure the raw data associated with the one or more aerial vehicle onboard system(s) 102. Based on the data aggregated by the one or more agent(s) 330a-n, the data configuration manager 328 generates one or more portions of vehicle operation data 336.

The vehicle operation data 336 in some contexts comprises data generated, collected, measured, received, and/or otherwise obtained by one or more components of the CVMP 300. For example, as mentioned herein, the data configuration manager 328 in some contexts generates one or more portions of vehicle operation data 336 based on the data aggregated by the one or more agent(s) 330a-n. Additionally, vehicle operation data 336 associated with a particular vehicle (e.g., the aerial vehicle 112) in some contexts is generated and/or received by the CVMP centralized services 302, the environment data system(s) 108, and/or the travel operation management system(s) 106. For example, the vehicle operation data 336 in some contexts comprises data indicative of a nominal scenario, an emergency scenario, data indicative of a hazard scenario, data indicative of a logistical scenario that alters the voyage of the vehicle, and/or data indicative of a change in the operation of a system affecting control of the vehicle. In various embodiments, at least a portion of the travel event data is based at least in part on vehicle sensor data collected, measured, calculated, and/or otherwise generated by one or more sensors associated with the vehicle. As such, vehicle operation data 336 in some contexts is any relevant data that provides contextual information for a current operation of a particular vehicle (e.g., the aerial vehicle 112). The data configuration manager 328 is configured to transmit one or more portions of vehicle operation data 336 to the vehicle state evaluation model 326. Furthermore, the data configuration manager 328 is also configured to facilitate the storage of one or more portions of data related to the one or more rules received from the federated learning model 310 in the onboard rules database 332.

The vehicle state evaluation model 326 in some contexts is an ML model associated with the onboard vehicle monitoring system 306 that continually receives model input comprising data related to one or more events, one or more portions of vehicle operation data 336, one or more portions of environmental data, one or more portions of vehicle sensor data, one or more portions of vehicle system data, one or more portions of air traffic data, one or more portions of logistical data, one or more portions of personnel data, one or more operator inputs, one or more flight plans, and/or one or more portions of data generated by one or more systems associated with the CVMP 300. In various embodiments, the vehicle state evaluation model 326 receives the model input via the network 110. Based at least in part on the received model input, the vehicle state evaluation model 326 generates one or more portions of model output describing one or more operational states of the vehicle (e.g., aerial vehicle 112). Additionally, the vehicle state evaluation model 326 associated with an onboard vehicle monitoring system 306 is configured to identify, classify, categorize, and/or analyze one or more events impacting the operation of a vehicle.

The vehicle state evaluation model 326 in some contexts determines that a vehicle is in a steady state (e.g., a nominal operational state) or a problem state (e.g., an adverse operational state). The vehicle state evaluation model 326 generates one or more portions of model output configured to describe the current status, operational parameters, data values, operational modes, and/or configurations of one or more vehicle systems associated with the vehicle. In this regard, if the vehicle state evaluation model 326 determines that one or more events are taking place that are impacting the operation of the vehicle, the vehicle state evaluation model 326 can determine how the one or more events are related to (e.g., how the one or more events are impacting) the respective vehicle systems.

As such, the vehicle state evaluation model 326 in some contexts generates one or more contextual data snapshots related to the current operational status of the vehicle as model output. The contextual data snapshots are one or more portions of data that have been configured for logging, analysis, ML model input, ML model training, and/or storage. For example, a contextual data snapshot in some contexts captures the steady state (e.g., nominal state) of the vehicle by logging, storing, and/or otherwise saving a current configuration of the one or more vehicle systems as well as how the configuration of the one or more vehicle systems relates to the current nominal operation of the vehicle. Similarly, the vehicle state evaluation model 326 in some contexts generates a contextual data snapshot capturing a problem state (e.g., an adverse operational state) related to one or more events impacting the operation of the vehicle and the respective vehicle systems (e.g., the aerial vehicle onboard system(s) 102) associated with the vehicle. The vehicle state evaluation model 326 transmits one or more contextual data snapshots to the rules engine 324 associated with the onboard vehicle monitoring system 306.

A contextual data snapshot associated with a steady state of a particular vehicle (e.g., an aerial vehicle 112) in some contexts is used in one or more data recovery operations for reverting the particular vehicle from a problem state back into a steady state. For example, the contextual data snapshot associated with the steady state in some contexts comprises one or more operational parameters, data values, operational modes, and/or configurations of one or more vehicle systems (e.g., the aerial vehicle onboard system(s) 102). As such, the contextual data snapshot associated with the steady state in some contexts is utilized to reconfigure, re-initialize, and/or otherwise update the one or more vehicle systems such that the vehicle resumes operating in a manner congruent with the corresponding steady state. In various embodiments, one or more portions of data related to the current operational state of the vehicle, one or more contextual data snapshots, one or more portions of vehicle operation data, and/or any data generated and/or managed by the vehicle state evaluation model 326 in some contexts is rendered via one or more computing device(s) associated with the CVMP centralized services (e.g., CVMP offboard apparatus 312).

Furthermore, in various embodiments, the vehicle state evaluation model 326 in some contexts is configured to classify the criticality of one or more events associated with a vehicle (e.g., an aerial vehicle 112). For instance, once the vehicle state evaluation model 326 determines that one or more events that can impact the operation of the vehicle is occurring, the vehicle state evaluation model 326 determines an event severity level associated with the one or more events. As a non-limiting example, the vehicle state evaluation model 326 in some contexts classifies one or more events as having a low severity level, a moderate severity level, a high severity level, a critical severity level, and/or the like. In various embodiments, one or more event severity thresholds in some contexts are predetermined and incorporated by the rules engine 324 such that when a respective event severity level associated with the one or more events satisfies the one or more event severity thresholds, the rules engine 324 generates one or more corrective actions to address the one or more events.

The vehicle state evaluation model 326 in some contexts determines a respective event type associated with one or more events impacting the operation of the vehicle. One or more event types in some contexts are determined based in part on one or more portions of vehicle operation data indicative of a nominal scenario, an emergency scenario, a hazard scenario, a scenario that alters the voyage of the aerial vehicle, and/or a change in the operation of a system affecting control of the aerial vehicle. In various embodiments, at least a portion of the vehicle operation data is based at least in part on vehicle sensor data collected, measured, calculated, and/or otherwise generated by one or more sensors (e.g., one or more sensors 210) associated with the vehicle.

A few non-limiting examples of event types that in some contexts is associated with a respective event include, an emergency event type, a hazard event type, a mechanical failure event type, a logistical event type, an environmental event type, an optimization event type, a personnel health event type, and/or the like. In some embodiments, event types in some contexts are associated with a predefined event severity level. For example, in some embodiments, a logistical event type in some contexts is automatically associated with a low severity level. However, the vehicle state evaluation model 326 in some contexts determines that a particular event associated with a logistical event type has a high event severity level due to various respective circumstances.

The vehicle state evaluation model 326 is configured to cause rendering of one or more portions of data related to the current state of a vehicle (e.g., the aerial vehicle 112) via, for example, the CVMP vehicle apparatus 200 and/or the CVMP offboard apparatus 312. For example, the vehicle state evaluation model 326 is configured to cause rendering of one or more portions of data related to a steady state of the vehicle, data related to a problem state of the vehicle, data related to the one or more events impacting the operation of the vehicle, data related to the vehicle operation data associated with the vehicle, data related to the vehicle sensor data associated with the vehicle, and/or the like.

Furthermore, the vehicle state evaluation model 326 is configured to generate one or more alerts, warnings, notifications, and/or prompts related to the one or more portions of data related to the current state of a vehicle (e.g., the aerial vehicle 112). The vehicle state evaluation model 326 cause rendering of the one or more alerts, warnings, notifications, and/or prompts via, for example, the CVMP vehicle apparatus 200 and/or the CVMP offboard apparatus 312. For example, the vehicle state evaluation model 326 in some contexts generates an alert detailing that a particular aerial vehicle 112 has entered into a problem state. The alert in some contexts details the problem sate, the one or more events impacting the operation of the vehicle, and/or the one or more vehicle systems (e.g., aerial vehicle onboard system(s) 102) that have been affected by the problem state and/or the one or more events. The vehicle state evaluation model 326 in some contexts causes rendering of the alert via the CVMP vehicle apparatus 200. Additionally or alternatively, the vehicle state evaluation model 326 causes transmission of the alert to the CVMP centralized services 302 in order to facilitate the rendering of the alert via one or more additional computing device(s) associated with the CVMP 300 (e.g., the CVMP offboard apparatus 312).

The vehicle state evaluation model 326 is configured to transmit data related to one or more contextual data snapshots, data related to one or more events, and/or data related to one or more operational states to the rules engine 324 to facilitate the mitigation of one or more events impacting the corresponding vehicle (e.g., the aerial vehicle 112).

The rules engine 324 in some contexts is a combination of one or more ML models associated with the onboard vehicle monitoring system 306 that is configured to receive, evaluate, enforce, and/or incorporate one or more rules provided by the federated learning model 310 associated with the CVMP centralized services 302. The rules engine 324 in some contexts comprises one or more ML models, math models, rule expression models, ANNs, RNNs, CNNs, and/or the like. In various embodiments, the rules engine 324 comprises a time series data analysis model. In various embodiments, the rules engine 324 in some contexts is configured in part by the one or more rules received by the federated learning model 310. Additionally or alternatively, the rules engine 324 can be configured based in part on a subset of (e.g., one or more portions of data related to) the federated learning model 310 associated with the CVMP centralized services 302.

In various embodiments, the rules engine 324 comprises a binary rule set, and/or a predetermined rule set received from the federated learning model 310 that in some contexts is used to determine one or more corrective actions based at least in part on the predetermined rule set. In various embodiments, one or more rules received from the federated learning model 310 comprise one or more operational thresholds related to the operation of the one or more vehicle system(s) associated with a particular vehicle (e.g., an aerial vehicle 112). Additionally or alternatively, the rules engine 324 in some contexts comprises one or more look-up tables and/or one or more machine learning (ML) algorithms configured and/or trained one on or more training data sets related to a specific domain of applicable knowledge (e.g., the aerospace domain).

The rules engine 324 is configured to generate one or more corrective actions based in part on one or more rules in response to receiving model output (e.g., contextual data snapshots) generated by the vehicle state evaluation model 326. For example, in various embodiments, the rules engine 324 comprises a time series data analysis model configured to generate the one or more corrective actions based in part on the one or more rules in response to receiving model output (e.g., contextual data snapshots) generated by the vehicle state evaluation model 326. Additionally or alternatively, the one or more corrective actions generated by the rules engine 324 based in part on the one or more rules comprises one or more pre-determined contingencies associated with one or more predefined events.

A corrective action in some contexts is model output generated by the rules engine 324 representing one or more suggested actionable measures that in some contexts is executed to address one or more events impacting the operation of a vehicle and, as such, revert the vehicle from a problem state back into a steady (e.g., nominal) state. Corrective actions in some contexts are configured to be human-readable and in some contexts is rendered via a respective electronic interface associated with one or more computing devices such as, for example a CVMP vehicle apparatus 200 associated with the vehicle and/or a CVMP offboard apparatus 312 associated with the CVMP centralized services 302.

In various embodiments, corrective actions in some contexts are executed automatically by the onboard vehicle monitoring system 306. In various other embodiments, the corrective actions in some contexts are confirmed by an operator of the vehicle, where confirmation in some contexts is a selection indication associated with the corrective actions generated via one or more computing devices and where the confirmation causes execution of the corrective actions. Executing a corrective action comprises operating one or more systems associated with the vehicle (e.g., one or more aerial vehicle onboard system(s) 102) to control the operation of the vehicle. In some embodiments, execution of a corrective action must be confirmed via a computing device (e.g., the CVMP vehicle apparatus 200 or the CVMP offboard apparatus 312). In various other embodiments, corrective actions in some contexts are automatically executed depending on the criticality of the corresponding event impacting the operation of the vehicle.

Non-limiting examples of corrective actions include a corrective action to execute an emergency landing, execute a controlled landing in a predetermined landing zone, switch a current operational mode of the aerial vehicle 112 (e.g., switch the aerial vehicle 112 into an economy flight mode from a normal operational mode), adjust one or more operational constraints (e.g., mission goals, flight plans, destinations, waypoints, and/or the like), alter a current flight path of aerial vehicle 112 (e.g., alter a current heading, altitude, speed, and/or the like), and/or reconfigure one or more vehicle systems (e.g., one or more aerial vehicle onboard system(s) 102) associated with the aerial vehicle 112.

The rules engine 324 in some contexts is configured to execute, or cause execution of, the one or more corrective actions based on the one or more rules. For example, in one or more embodiments, the rules engine 324 in some contexts directs the CVMP vehicle apparatus 200 to execute the one or more corrective actions by operating, updating configurations for, and/or otherwise controlling one or more respective aerial vehicle onboard system(s) associated with an aerial vehicle 112.

Additionally, the rules engine 324 in some contexts determines which corrective actions of a set corrective actions will have the greatest positive effect on the current situation associated with a vehicle being impacted by one or more events. For example, in some embodiments, the rules engine 324 ranks one or more corrective actions of the set of corrective actions based at least in part on a predicted result associated with the execution of the one or more corrective actions. For instance, a first corrective action in some contexts is ranked higher relative to a second corrective action based at least in part on a predicted result associated with the first corrective action. In some embodiments, one or more corrective actions are executed by the rules engine 324 based on a respective rank of the one or more corrective actions. For example, a first corrective action that is ranked higher relative to a second corrective action in some contexts is executed by the rules engine 324, whereas the rules engine 324 determines not to execute the second corrective action that ranked lower than the first corrective action.

In various circumstances, there exists a one-to-one, one-to-many, many-to-one, or many-to-many relationship between events impacting the operation of a vehicle and corrective actions generated in response to the events. For example, in one particular circumstance, the vehicle state evaluation model 326 determines that a single event is impacting the operation of a vehicle (e.g., an aerial vehicle 112) and transmit contextual data related to the single event to the rules engine 324. Based on the contextual data associated with the single event, the rules engine 324 generates one or more corrective actions with which to mitigate the single event. Alternatively, in another particular circumstance, the vehicle state evaluation model 326 determines that multiple distinct events are impacting the operation of the vehicle and the rules engine 324 determines that only one corrective action would be applicable for mitigating the multiple events. Alternatively, in yet another particular circumstance, the vehicle state evaluation model 326 determines that multiple events are impacting the operation of the vehicle and, as such, the rules engine 324 generates a plurality of corrective actions with which to mitigate the multiple events.

Furthermore, the rules engine 324 is configured to determine, in conjunction with the vehicle state evaluation model 326, if the one or more corrective actions that were executed have successfully reverted the vehicle back to a steady state from a problem state. For example, if the rules engine 324 determines, in conjunction with the vehicle state evaluation model 326, that a first set of corrective actions generated based on a first set of rules have been executed but the vehicle remains in the problem state (or has entered into a new problem state), the rules engine 324 causes generation of a request for a second set of rules. For example, the rules engine 324 in some contexts causes the generation of a request for additional rules based on a current operational context and/or the one or more events impacting the operation of the vehicle. The rules engine 324 causes the transmission (e.g., via the node manager 322 associated with the onboard vehicle monitoring system 306) of the request to the CVMP centralized services 302. In response to the request, the CVMP offboard apparatus 312 in some contexts directs the federated learning model 310 associated with the CVMP centralized services 302 to generate, select, retrieve, and/or otherwise determine a second set of rules to transmit to the onboard vehicle monitoring system 306 of the vehicle. Upon receipt of the second set of rules, the rules engine 324 generates a second set of corrective actions with which to mitigate the one or more events impacting the operation of the vehicle.

The data publisher 334 is configured to transmit one or more portions of data to the CVMP centralized services 302 and/or the IoT SCS 304. For example, the data publisher 334 in some contexts transmits one or more portions of event mitigation data 338 to the CVMP centralized services 302 and/or the IoT SCS 304 for storage in the data store 314 and/or the data lake 316. In various embodiments, the data publisher 334 transmits the event mitigation data 338 to the CVMP centralized services 302 and/or the IoT SCS 304 on a predefined schedule. For example, the onboard vehicle monitoring system 306 of a particular vehicle (e.g., an aerial vehicle 112) in some contexts causes the data publisher 334 to transmit the event mitigation data 338 to the CVMP centralized services 302 and/or the IoT SCS 304 every night the particular corresponding vehicle is parked and connected to a network 110 (e.g., via ground-based broadband Wi-Fi connection) associated with the CVMP centralized services 302 and/or the IoT SCS 304. Additionally or alternatively, the data publisher 334 in some contexts is configured to transmit the event mitigation data 338 based on a predefine schedule such as, for example, every hour, every 12 hours, daily, every other day, weekly, monthly, and/or the like.

Figure 4:
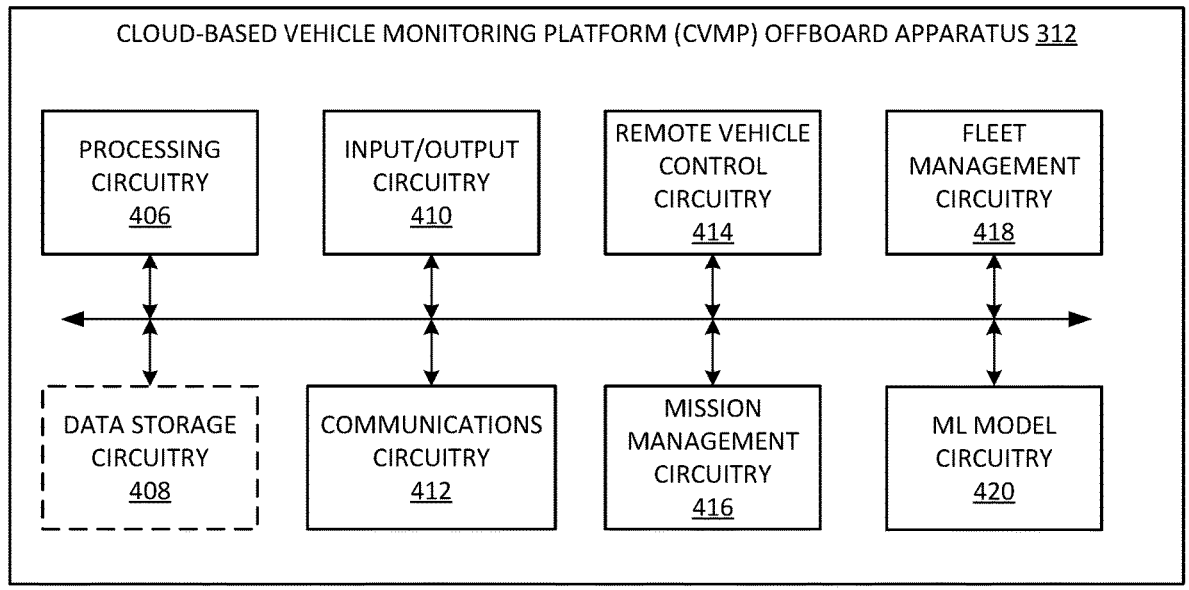
FIG. 4 illustrates an example CVMP offboard apparatus in accordance with at least some example embodiments of the present disclosure.

FIG. 4 illustrates an example CVMP offboard apparatus 312 associated with the CVMP centralized services 302 in accordance with at least some example embodiments of the present disclosure. As depicted in FIG. 4, the CVMP offboard apparatus 312 comprises processing circuitry 406, data storage circuitry 408, input/output circuitry 410, communications circuitry 412, remote vehicle control circuitry 414, mission management circuitry 416, and/or fleet management circuitry 418, ML model circuitry 420. In some embodiments, other elements of the CVMP offboard apparatus 312 provide or supplement the functionality of another particular set of circuitry. For example, the processing circuitry 406 in some embodiments provides processing functionality to any of the other sets of circuitry, the data storage circuitry 408 provides storage functionality to any of other the sets of circuitry, the communications circuitry 412 provides network interface functionality to any of the other sets of circuitry, and/or the like. Additionally or alternatively, in various embodiments, the CVMP offboard apparatus 312 is configured to control, configure, and/or otherwise operate one or more of the circuitries 202-214 of the CVMP vehicle apparatus 200 illustrated in FIG. 2 via the network 110. Additionally or alternatively, the CVMP offboard apparatus 312 is configured to control, configure, and/or otherwise operate the one or more aerial vehicle onboard system(s) 102 associated with a vehicle (e.g., the aerial vehicle 112), as well as the other connected vehicle system(s) 104.

In some embodiments, the processing circuitry 406 (and/or co-processor or any other processing circuitry assisting or otherwise associated with the processor) is/are in communication with the data storage circuitry 408 via a bus for passing information among components of the CVMP offboard apparatus 312. In some embodiments, for example, the data storage circuitry 408 is non-transitory and includes for example, one or more volatile and/or non-volatile memories. In other words, for example, the data storage circuitry 408 in some embodiments includes or embodies an electronic storage device (e.g., a computer readable storage medium). In some embodiments, the data storage circuitry 408 is configured to store information, data, content, applications, instructions, or the like, for enabling the CVMP offboard apparatus 312 to carry out various functions in accordance with example embodiments of the present disclosure.

In various embodiments, the processing circuitry 406 is embodied in a number of different ways. For example, in some example embodiments, the processing circuitry 406 includes one or more processing devices configured to perform independently. Additionally or alternatively, in some embodiments, the processing circuitry 406 includes one or more processor(s) configured in tandem via a bus to enable independent execution of instructions, pipelining, and/or multithreading. The use of the terms "processor" and "processing circuitry" should be understood to include a single core processor, a multi-core processor, multiple processors internal to the CVMP offboard apparatus 312, and/or one or more remote or "cloud" processor(s) external to the CVMP offboard apparatus 312.

In an example embodiment, the processing circuitry 406 is configured to execute instructions stored in the data storage circuitry 408 or otherwise accessible to the processing circuitry 406. Alternatively or additionally, the processing circuitry 406 in some embodiments is configured to execute hard-coded functionality. As such, whether configured by hardware or software methods, or by a combination thereof, the processing circuitry 406 represents an entity (e.g., physically embodied in circuitry) capable of performing operations according to an embodiment of the present disclosure while configured accordingly. Alternatively or additionally, as another example in some example embodiments, when the processing circuitry 406 is embodied as an executor of software instructions, the instructions specifically configure the processing circuitry 406 to perform the algorithms embodied in the specific operations described herein when such instructions are executed.

As one particular example embodiment, the processing circuitry 406 is configured to perform various operations associated with responding to one or more requests received from a vehicle (e.g., an aerial vehicle 112) (e.g., requests generated via the onboard vehicle monitoring system 306) as described further herein. In some embodiments, the processing circuitry 406 includes hardware, software, firmware, and/or a combination thereof, that receives data including one or more portions of vehicle operation data, vehicle sensor data, environmental data, logistical data, and/or data related to one or more events impacting the operation of the vehicle. Additionally or alternatively, in some embodiments, the processing circuitry 406 includes hardware, software, firmware, and/or a combination thereof, that causes rendering one or more corrective actions generated by the rules engine 324 of the vehicle via one or more electronic interfaces associated with the CVMP offboard apparatus 312 and/or one or more electronic interfaces associated with other computing devices related to the CVMP centralized services 302 and/or the CVMP 300. Additionally or alternatively, in some embodiments, the processing circuitry 406 includes hardware, software, firmware, and/or a combination thereof, that in real-time updates rendering of a user interface and/or interface element(s) thereof in response to updated data related to the one or more events, one or more rules associated with the federated learning model 310, and/or one or more portions of data associated with the operation of the vehicle.

In some embodiments, CVMP offboard apparatus 312 includes data storage circuitry 408 that is configured to store, update, retrieve, delete, and/or otherwise one or more portions of data associated with the rules database 308 and/or data store 314 of the CVMP centralized services 302, and/or the data lake 316 associated with the IoT SCS 304. As described herein, the data storage circuitry 408 in some contexts stores and/or retrieves one or more computer program instructions associated with the one or more operations described herein. In various embodiments, the data storage circuitry 408 embodies, or integrates with, a server system, a cloud storage system, a collection of databases, one or more data stores, and/or any other type of non-transitory storage medium. In certain embodiments, the data storage circuitry 408 stores one or more portions of data obtained from the travel operation management system(s) 106 and/or the environment data system(s) 108, as well as any data related to any events associated with the vehicle (e.g., the aerial vehicle 112). Additionally, the data storage circuitry 408 is configured to store, update, retrieve, delete, and/or otherwise maintain any training data associated with the federated learning model 310.

In some embodiments, CVMP offboard apparatus 312 includes input/output circuitry 410 that provides output to the user and, in some embodiments, to receive an indication of a user input (e.g., user input generated by a remote operator, ground crew member, and/or the like). In some embodiments, the input/output circuitry 410 is in communication with the processing circuitry 406 to provide such functionality. The input/output circuitry 410 comprises one or more user interface(s) and in some embodiments includes a display that comprises the interface(s) rendered as a web user interface, an application user interface, a user device, a backend system, or the like. In some embodiments, the input/output circuitry 410 also includes a keyboard, a mouse, a joystick, a touch screen, touch areas, soft keys a microphone, a speaker, or other input/output mechanisms. The processing circuitry 406, and/or input/output circuitry 410 comprising a processor, in some embodiments is configured to control one or more functions of one or more user interface elements through computer program instructions (e.g., software and/or firmware) stored on a memory accessible to the processing circuitry 406 (e.g., data storage circuitry 408, and/or the like). In some embodiments, the input/output circuitry 410 includes or utilizes a user-facing application to provide input/output functionality to a service maintainer device and/or other display associated with a user. In some embodiments, the input/output circuitry 410 includes a primary flight display and/or a multi-function display of a vehicle (e.g., an aerial vehicle 112). Additionally or alternatively, in some embodiments, the input/output circuitry 410 includes one or more software-rendered user interface(s) including interface element(s) that depict particular data and/or information, and/or that receive user input.

The communications circuitry 412 includes any means such as a device or circuitry embodied in either hardware or a combination of hardware and software that is configured to receive and/or transmit data from/to a communications network and/or any other computing device, circuitry, or module in communication with the CVMP offboard apparatus 312. In this regard, the communications circuitry 412 includes, for example in some embodiments, a network interface for enabling communications with a wired or wireless communications network. Additionally or alternatively in some embodiments, the communications circuitry 412 includes one or more network interface card(s), antenna (s), bus(es), switch(es), router(s), modem(s), and supporting hardware, firmware, and/or software, or any other device suitable for enabling communications via one or more communications network(s) (e.g., the network 110). Additionally or alternatively, the communications circuitry 412 includes circuitry for interacting with the antenna(s) and/or other hardware or software to cause transmission of signals via the antenna(s) or to handle receipt of signals received via the antenna(s). In some embodiments, the communications circuitry 412 enables transmission to and/or receipt of data from one or more computing device(s) and/or system(s) of other connected vehicle system(s) 104, travel operation management system(s) 106, and/or environment data system (s) 108, in communication with the CVMP offboard apparatus 312. Additionally or alternatively, the communications circuitry 412 includes circuitry for interacting with the IoT SCS 304.

The remote vehicle control circuitry 414 includes hardware, software, firmware, and/or a combination thereof, that supports functionality associated with navigating and/or controlling a vehicle (e.g., an aerial vehicle 112) remotely from the CVMP centralized services 302. In some embodiments, remote vehicle control circuitry 414 controls and/or configures one or more of the aerial onboard system(s) 102 associated with the vehicle. In some embodiments, remote vehicle control circuitry 414 includes hardware, software, firmware, and/or a combination thereof, that receives flight detail data (e.g., embodying a flight plan), location service(s) data representing a location of the vehicle, and/or the like. Additionally or alternatively, in some embodiments, the remote vehicle control circuitry 414 includes hardware, software, firmware, and/or a combination thereof, that depicts interface element(s) representing at least a flight path or indication where the vehicle is currently travelling and/or should travel.

Additionally or alternatively, in some embodiments, the remote vehicle control circuitry 414 includes hardware, software, firmware, and/or a combination thereof, that autonomously control(s) one or more component(s) of a vehicle (e.g., an aerial vehicle 112). In some such embodiments, the remote vehicle control circuitry 414 autonomously control(s) one or more physical component(s) of the vehicle to facilitate movement of the vehicle along a particular path. Alternatively or additionally, in some embodiments, the remote vehicle control circuitry 414 includes hardware, software, firmware, and/or a combination thereof, that semi-autonomously control(s) one or more component (s) of an aerial vehicle 112, for example where certain aspects of the operation of the vehicle are autonomously performed and others (e.g., directional control) is/are controlled by a user (e.g., a remote operator). Alternatively or additionally, in some embodiments, the remote vehicle control circuitry 414 includes hardware, software, firmware, and/or a combination thereof, that receives remote operator input for controlling one or more component(s) of a vehicle, for example via vehicle flight control(s) to alter speed and/or direction of the vehicle. Alternatively or additionally, in some embodiments, the remote vehicle control circuitry 414 includes hardware, software, firmware, and/or a combination thereof, that causes changes to an operational mode of a vehicle (e.g., an aerial vehicle 112), for example autonomously based at least in part on one or more data-driven event(s) and/or triggers, or in response to user input initiating the change in operational mode. It will be appreciated that, in some embodiments, the remote vehicle control circuitry 414 includes a separate processor, specially configured field programmable gate array (FPGA), or a specially programmed application specific integrated circuit (ASIC).

The mission management circuitry 416 includes hardware, software, firmware, and/or a combination thereof, that supports functionality associated with generating, receiving, configuring, and/or otherwise managing data related to the mission of one or more vehicle(s) associated with the CVMP 300. For example, the mission management circuitry 416 is configured to generate and/or manage one or more vehicle operation constraints associated with the operation of a vehicle. Vehicle operation constraints include, but are not limited to, constraints related to the configuration of one or more vehicle systems associated with the vehicle, constraints related to a flight plan (e.g., destinations, waypoints, flight paths, arrival/departure schedules and/or procedures, traffic management constraints and/or the like), power consumption constraints (e.g., battery and/or fuel consumption thresholds), specific vehicle constraints (e.g., performance capabilities associated with one or more vehicle systems of the aerial vehicle 112), environmental constraints (e.g., regulations related to operating an aerial vehicle 112 in an urban environment), and/or the like. In various embodiments, the one or more vehicle operation constraints in some contexts are rendered via a respective electronic interface associated with the CVMP vehicle apparatus 200 and/or the CVMP offboard apparatus 312.

Additionally, the mission management circuitry 416 includes hardware, software, firmware, and/or a combination thereof, that supports functionality associated with handling one or more logistical aspects of the one or more vehicles (e.g., the one or more aerial vehicle(s) 112) associated with the CVMP 300. Non-limiting examples include monitoring the logistical aspects of one or more destinations (e.g., one or more airports and/or vertiports) associated with a flight plan of the aerial vehicle 112. For example, the mission management circuitry 416 in some contexts monitors occupancy (e.g., available facilities to accommodate an aerial vehicle 112) associated with a destination. Additionally or alternatively, the mission management circuitry 416 in some contexts determines logistical aspects related to potential destinations such as nearby health and safety services.

The fleet management circuitry 418 includes hardware, software, firmware, and/or a combination thereof, that supports functionality associated with the management of a fleet of vehicles (e.g., aerial vehicle(s) 112) associated with an enterprise related to the CVMP 300. In various embodiments, the fleet management circuitry 418 includes hardware, software, firmware, and/or a combination thereof, that monitors the location, operational status, health, performance, and/or capabilities of one or more vehicle(s) associated with the CVMP 300. In this regard, the fleet management circuitry 418 generates one or more portions of fleet management data configured as model input for the federated learning model 310.

The ML model circuitry 420 includes hardware, software, firmware, and/or a combination thereof, that supports functionality associated with the federated learning model 310 associated with the CVMP centralized services 302. For example, the ML model circuitry 420 executes, at least in part, one or more portions of program code associated with the methods and operations of the federated learning model 310. For example, the ML model circuitry 420 includes hardware, software, firmware, and/or a combination thereof, that receives and/or analyzes one or more portions of model input comprising vehicle operation data, vehicle sensor data, vehicle system data, air traffic data, environmental data, logistical data, personnel data, and/or any other relevant data related to a particular vehicle (e.g., a particular aerial vehicle 112). Vehicle operation data in some contexts is generated in part by one or more components of the vehicle, one or more components of the CVMP offboard apparatus 312, and/or one or more of the environment data system(s) 108 and the travel operation management system(s) 106 associated with the CVMP centralized services 302. Additionally, the ML model circuitry 420 in some contexts is configured to receive one or more portions of data related to a request (e.g., a request for one or more rules with which to mitigate one or more events) transmitted by onboard vehicle monitoring system 306 of the vehicle.

Additionally, in various embodiments, the ML model circuitry 420 includes hardware, software, firmware, and/or a combination thereof, that in some contexts is employed to train and/or retrain the federated learning model 310 based at least in part on one or more portions of event mitigation data 338 and/or prior model input comprising one or more prior events, one or more prior portions of prior vehicle operation data, one or more prior portions of prior vehicle sensor data, one or more prior operator inputs, and/or one or more prior vehicle operation constraints. In various embodiments, the ML model circuitry 420 is configured to facilitate the training and/or retraining of the federated learning model 310 based in part on a predefined schedule such as, for example, daily, weekly, bi-weekly, monthly, and/or the like. In this regard, the ML model circuitry 420 includes hardware, software, firmware, and/or a combination thereof, that causes the storage, updating, retrieval, and/or the deletion of one or more portions of data associated with the federated learning model 310.

It will be appreciated that, further in some embodiments, two or more of the sets of circuitries 406-420 are combinable. Alternatively or additionally, in some embodiments, one or more of the sets of circuitry 406-420 perform some or all of the functionality described associated with another component. For example, in some embodiments, one or more of the sets of circuitry 406-420 are combined into a single component embodied in hardware, software, firmware, and/or a combination thereof. For example, in some embodiments, two or more of the remote vehicle control circuitry 414 and ML model circuitry 420 are embodied by a single set of circuitry that performs the combined operations of the individual sets of circuitry. Similarly, in some embodiments, one or more of the sets of circuitry, for example remote vehicle control circuitry 414 and/or ML model circuitry 420 is/are combined with the processing circuitry 406, such that the processing circuitry 406 performs one or more of the operations described above with respect to each of these other sets of circuitry.

Example Processes of the Disclosure

Having described example systems, apparatuses, data flows, user interfaces, and user interface elements in accordance with the present disclosure, example processes of the disclosure will now be discussed. It will be appreciated that each of the flowcharts depicts an example computer-implemented process that is performable by various means, including one or more of the apparatuses, systems, devices, and/or computer program products described herein, for example utilizing one or more of the specially configured components thereof.

It will be understood that each block of the processes, and combinations of blocks in the flowcharts, may be implemented by various means including hardware and/or a computer program product comprising one or more computer-readable mediums having computer-readable program instructions stored thereon. For example, one or more of the processes described herein in some embodiments is/are embodied by computer program of a computer program product. In this regard, the computer program product(s) that embody the process(es) described herein in some embodiments comprise one or more non-transitory memory devices of a computing device, apparatus, and/or the like (for example, the memory 204 of the cloud-based vehicle monitoring platform (CVMP) vehicle apparatus 200) storing instructions executable by a processor of a computing device (for example, by the processor 202 of the CVMP vehicle apparatus 200). In some embodiments, the computer program instructions of the computer program product that embody the processes are stored by non-transitory computer-readable storage mediums of a plurality of computing devices. It will be appreciated that any such computer program product(s) may be loaded onto one or more computer(s) and/or other programmable apparatus(es) (for example, a CVMP vehicle apparatus 200), such that the computer program product including the program code instructions that execute on the computer(s) or other programmable apparatus(es) create means for implementing the functions specified in the operational block(s).

Further, in some embodiments, the computer program product includes one or more non-transitory computer-readable memories on which the computer program instructions are stored such that the one or more computer-readable memories can direct one or more computer(s) and/or other programmable apparatus(es) to function in a particular manner, such that the computer program product comprises an article of manufacture that implements the function(s) specified in the operational block(s). Additionally or alternatively, in some embodiments, the computer program instructions of one or more computer program product(s) are loaded onto computer(s) or other programmable apparatus(es) to cause a series of operations to be performed on the computer(s) or other programmable apparatus(es) a computer-implemented process such that the instructions that execute on the computer(s) or other programmable apparatus(es) implement the functions specified in the operational block(s).

Each of the processes depicted includes a plurality of operational blocks defining a particular algorithm for performing one or more portion(s) of functionality for generating and/or outputting improved user interface(s) as described herein. The blocks indicate operations of each process. Such operations may be performed in any of a number of ways, including, without limitation, in the order and manner as depicted and described herein. In some embodiments, one or more blocks of any of the processes described herein occur in-between one or more blocks of another process, before one or more blocks of another process, in parallel with one or more blocks of another process, and/or as a sub-process of a second process. Additionally or alternatively, any of the processes in various embodiments include some or all operational steps described and/or depicted, including one or more optional blocks in some embodiments. With regard to the flowcharts illustrated herein, one or more of the depicted block(s) in some embodiments is/are optional in some, or all, embodiments of the disclosure. Optional blocks are depicted with broken (or "dashed") lines. Similarly, it should be appreciated that one or more of the operations of each flowchart may be combinable, replaceable, and/or otherwise altered as described herein.

Figure 5:
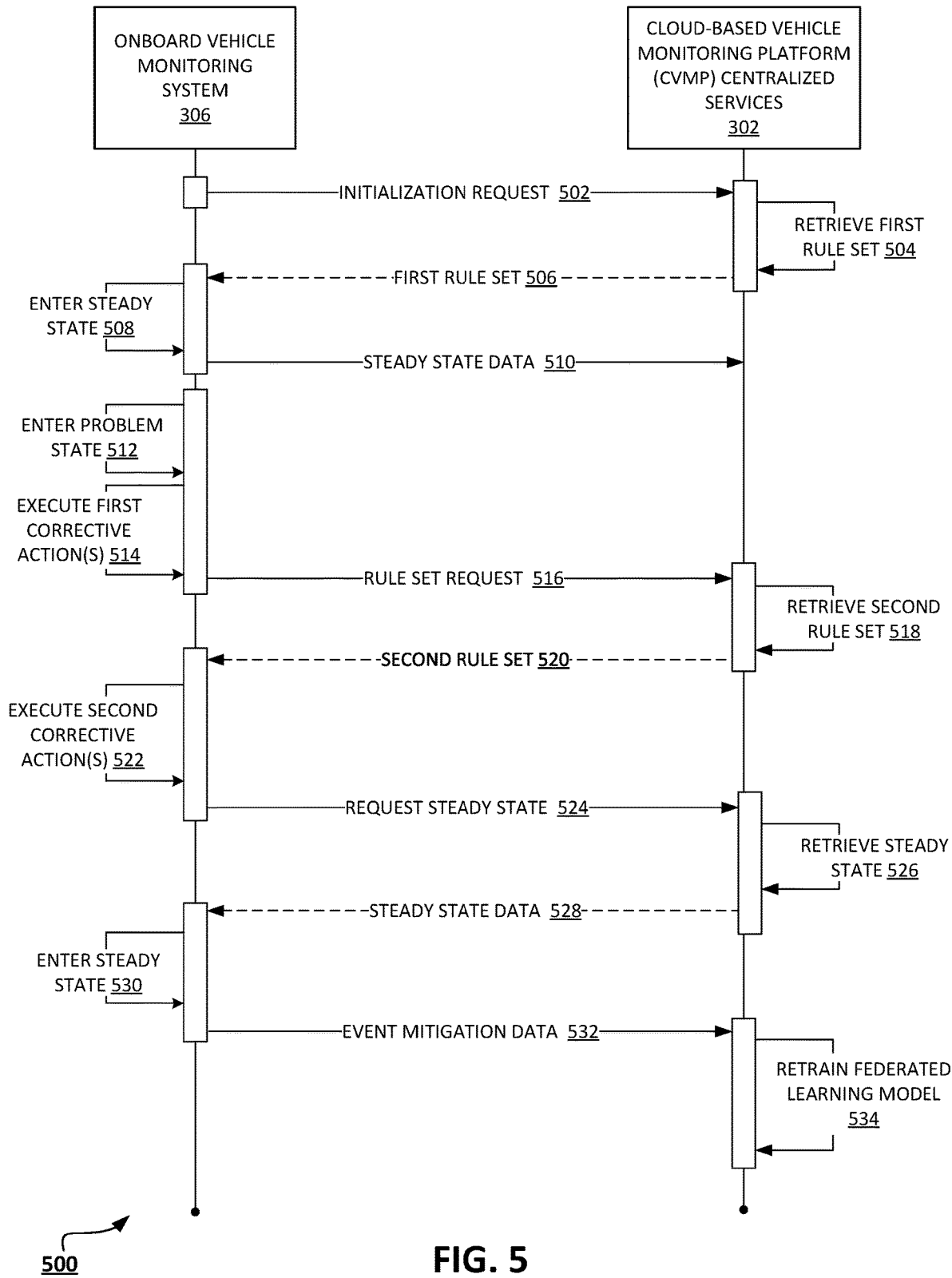
FIG. 5 illustrates a process flow diagram detailing various data flows between an onboard vehicle monitoring system and CVMP centralized services in accordance with at least some example embodiments of the present disclosure.

FIG. 5 illustrates a process flow diagram detailing various data flows between an onboard vehicle monitoring system 306 and CVMP centralized services 302 in accordance with at least some example embodiments of the present disclosure. Specifically, FIG. 5 details an exemplary process 500 in which one or more embodiments may execute some of the various methods described herein.

The process 500 begins at step 502 in which the onboard vehicle monitoring system 306 associated with a particular vehicle (e.g., an aerial vehicle 112) generates an initialization request. The initialization request is a request for a first rule set associated with the vehicle. In various embodiments, one or more rules associated with a federated learning model 310 (e.g., comprised in rules database 308) is specifically configured for a particular type of vehicle (e.g., the aerial vehicle 112). For example, the rules database 308 in some embodiments comprises one or more rules configured for various types of vehicles including, but not limited to, a particular make, model, and/or manufacturer of passenger airplane, helicopter, unmanned aerial vehicle, electronic vertical takeoff or landing (eVTOL) aircraft, jet, drone, or quadcopter. Furthermore, in various embodiments, the one or more rules comprised in the rules database 308 are be configured for various other types of vehicles such as, for example, a particular make, model, and/or manufacturer of watercraft, automobile, and/or rail-based vehicle. The initialization request comprises one or more identifiers associated with the vehicle (e.g., the aerial vehicle 112). For example, the node manager 322 appends one or more identifying portions of data to the headers of one or more data packets associated with the initialization request.

At step 504, the CVMP centralized services 302 retrieves a first rule set based on the initialization request. The federated learning model 310 determines, based on the initialization request, a first set of rules for the vehicle (e.g., the aerial vehicle 112 associated with the onboard vehicle monitoring system 306. At step 506, the federated learning model 310, in conjunction with the CVMP offboard apparatus 312 transmits the first rule set to the onboard vehicle monitoring system 306 (e.g., via the network 110). The onboard vehicle monitoring system 306 associated with the vehicle receives the first rule set and configure the rules engine 324 based on the first rule set.

At step 508, the vehicle enters a steady state. For example, an aerial vehicle 112 can depart on a predetermined mission (e.g., based on a predetermined flight plan) and begin traveling in a nominal, steady state in which all systems associated with the aerial vehicle 112 (e.g., the one or more aerial vehicle onboard system(s) 102) are operating as expected.

At step 510, the onboard vehicle monitoring system 306 transmits (e.g., via the data publisher 334 and/or the node manager 322) data related to the steady state of the vehicle. For example, the vehicle state evaluation model 326 captures (e.g., generates) a contextual data snapshot associated with the steady state of an aerial vehicle 112. Such a contextual data snapshot is used in one or more data recovery operations for reverting the aerial vehicle 112 from a problem state back into a steady state. For example, the contextual data snapshot associated with the steady state comprises one or more operational parameters, data values, operational modes, and/or configurations of one or more vehicle systems. As such, the contextual data snapshot associated with the steady state is utilized to reconfigure, re-initialize, and/or otherwise update the one or more vehicle systems such that the vehicle resumes operating in a manner congruent with the corresponding steady state. The onboard vehicle monitoring system 306 is configured to transmit (e.g., via the node manager 322) one more portions of data related to the current operation of a vehicle (e.g., steady state data, problem state data, contextual data snapshots, and/or the like) to the CVMP centralized services 302 for storage in the data store 314.

At step 512, the vehicle state evaluation model 326 associated with the onboard vehicle monitoring system 306 detects that one or more events are impacting the operation of the vehicle. For example, based on one or more portions of vehicle operation data 336 generated, aggregated, and/or received by the data configuration manager 328, the vehicle state evaluation model 326 determines that one or more events are adversely impacting the operation of an aerial vehicle 112. In some embodiments, the vehicle state evaluation model 326 captures (e.g., generates) a contextual data snapshot comprising one or more portions of data related to the one or more events impacting the operation of the vehicle and/or one or more portions of data related to the problem state associated with the operation of the vehicle. The vehicle state evaluation model 326 transmits the contextual data snapshot to the rules engine 324.

At step 514, the rules engine 324 receives the contextual data snapshot from the vehicle state evaluation model 326. The rules engine 324 generates a first set of corrective actions based on the first rule set received from the CVMP centralized services 302 in response to receiving the contextual data snapshot associated with the problem state of the vehicle. As a non-limiting example, the contextual data snapshot associated with the problem state of an aerial vehicle 112 corresponds to one or more failures of one or more respective aerial vehicle onboard system(s) 102. As such, the rules engine 324 generates a first set of corrective actions for reconfiguring, adjusting, power cycling, and/or otherwise operating the one or more failing aerial vehicle onboard system(s) 102 in an attempt to the correct, mitigate, and/or otherwise address the failures.

The rules engine 324 is configured to determine, in conjunction with the vehicle state evaluation model 326, if the first set of corrective actions that were executed have successfully mitigated the one or more failures associated with the one or more respective aerial vehicle onboard system(s) 102. If the rules engine 324 determines, in conjunction with the vehicle state evaluation model 326, that the first set of corrective actions generated based on a first set of rules have been executed but the vehicle remains in the problem state (or has entered into a new problem state), the rules engine 324 causes generation of a rule set request configured to request a second set of rules from the CVMP centralized services 302.

As such, at step 516, the rules engine 324 causes generation and/or transmission of a rule set request to the CVMP centralized services 302 (e.g., via the node manager 322). The rule set request comprises data related to the one or events impacting the vehicle (e.g., the failure of the one or more aerial vehicle onboard system(s) 102), one or more portions of vehicle operation data 336, one or more portions of vehicle sensor data, and/or one or more portions of data related to the current problem state of the vehicle. At step 518 the CVMP centralized services 302 receives the rule set request (e.g., via the CVMP offboard apparatus 312). In response to receiving the rule set request, the CVMP offboard apparatus 312 directs the federated learning model 310 to generate, select, and/or otherwise determine a second rule set for the vehicle experiencing the one or more respective failures of the aerial vehicle onboard system(s) 102.

At step 520, the federated learning model 310 generates, select, and/or otherwise determine a second rule set based on the rule set request received by the CVMP centralized services 302 (e.g., by the CVMP offboard apparatus 312). As such, the federated learning model 310 causes transmission (e.g., via the CVMP offboard apparatus 312) of the second rule set to the onboard vehicle monitoring system 306.

At step 522, the onboard vehicle monitoring system 306 receives the second rule set (e.g., via the node manager 322) and the data configuration manager 328 transmits the second rule set to the rules engine 324. The rules engine 324 generates, based on the second rule set, a second set of corrective actions for mitigating the one or more events impacting the vehicle (e.g., the one or more respective failures of the aerial vehicle onboard system(s) 102) and execute the second set of corrective actions.

At step 524, the rules engine 324 can determine that the second set of corrective actions has successfully mitigated the one or more respective failures of the aerial vehicle onboard system(s) 102. In response to determining that the second set of corrective actions was successful, the rules engine 324 causes generation and transmission of steady state request to CVMP centralized services 302. At step 526, the CVMP centralized services, by way of the CVMP offboard apparatus 312, retrieves the steady state data (e.g., the contextual data snapshot comprising the steady state) of the vehicle from the data store 314. At step 528, the CVMP offboard apparatus 312 transmits the steady state data back to the onboard vehicle monitoring system 306.

At step 530, the onboard vehicle monitoring system 306 utilizes the one or more operational parameters, the data values, the operational modes, and/or the configurations of one or more vehicle systems associated with the steady state data (e.g., the contextual data snapshot associated with the steady state). As such, the contextual data snapshot associated with the steady state is utilized to reconfigure, re-initialize, and/or otherwise update the one or more vehicle systems (e.g., the aerial vehicle onboard system(s) 102) such that the vehicle resumes operating in a manner congruent with the corresponding steady state that the vehicle was originally operating in.

At step 532, the onboard vehicle monitoring system 306 can transmit one or more portions of event mitigation data 338 to the CVMP centralized services 302 and/or the IoT SCS 304. The event mitigation data 338 is data related to one or more respective rules and/or one or more respective corrective actions associated with the one or more respective rules that were employed to mitigate, correct, and/or otherwise address the one or more events impacting the operation of the vehicle. The event mitigation data 338 in some contexts comprises data related to the one or more events that cause the aerial vehicle 112 to enter into the problem state from the steady state. The event mitigation data 338 can indicate whether the one or more respective rules and/or corrective actions associated with the rules were successful or unsuccessful in causing the vehicle to revert back into the steady state from the problem state. Additionally, the event mitigation data 338 is configured to train, retrain, and/or otherwise updated the federated learning model 310 associated with the CVMP centralized services 302. In some embodiments, transmitting the event mitigation data 338 to the CVMP centralized services 302 and/or the IoT SCS 304 causes automatic updating of the federated learning model 310.

At step 534, the CVMP offboard apparatus 312 is employed to retrain, modify, and/or otherwise update the federated learning model 310 based on the event mitigation data 338. In this manner, the federated learning model 310 is iteratively retrained and/or otherwise updated based on data related to one or more vehicles associated with the CVMP 300. For example, the federated learning model 310 in some contexts is trained and/or retrained based in part on one or more portions of event mitigation data 338 related to one or more vehicles associated with one or more respective enterprises related to the CVMP 300.

Figure 6A:
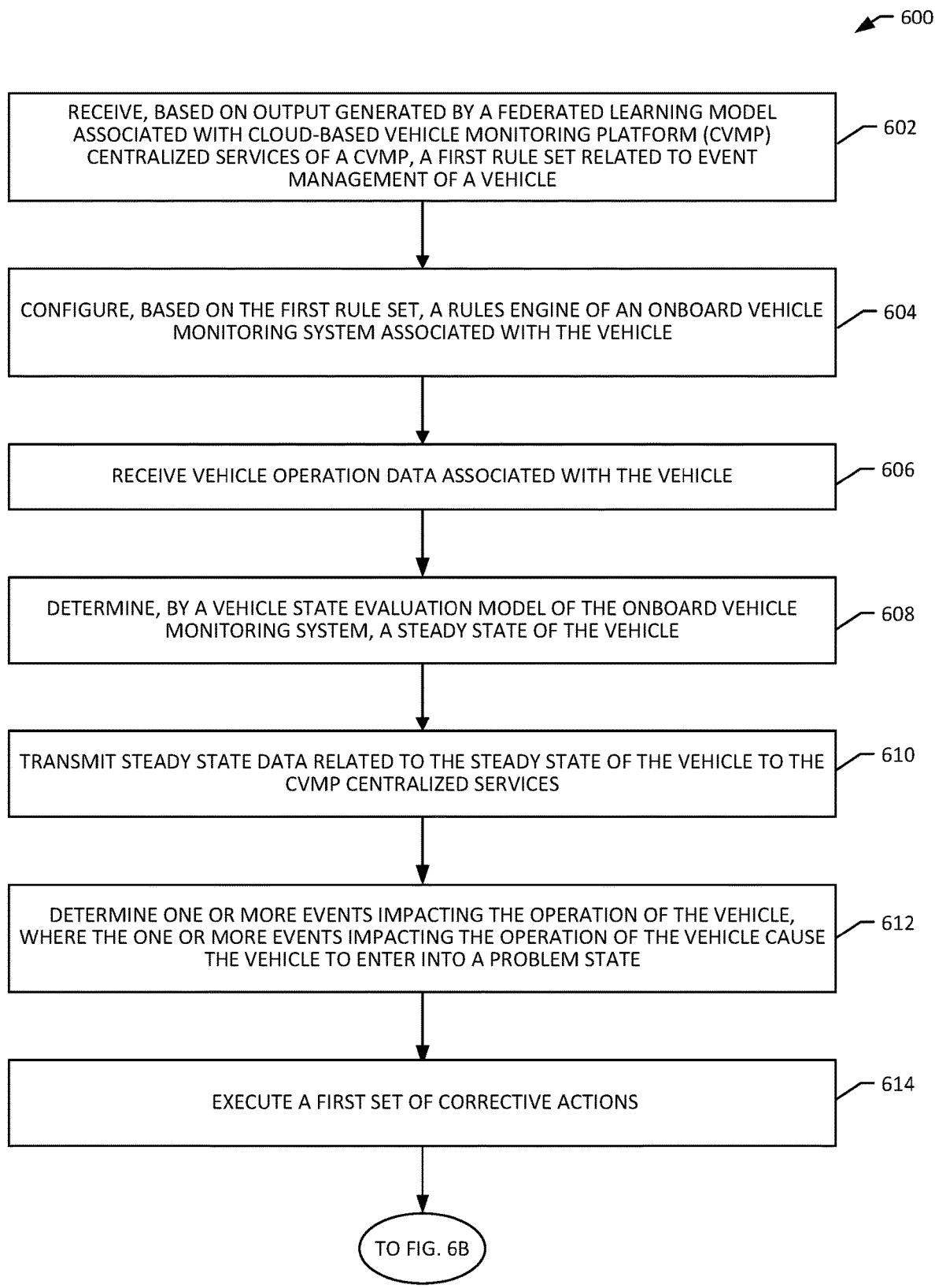
FIGS. 6A-6B illustrate flowcharts depicting example operations of an example process for managing one or more vehicles associated with a CVMP in accordance with at least some example embodiments of the present disclosure.
Figure 6B:
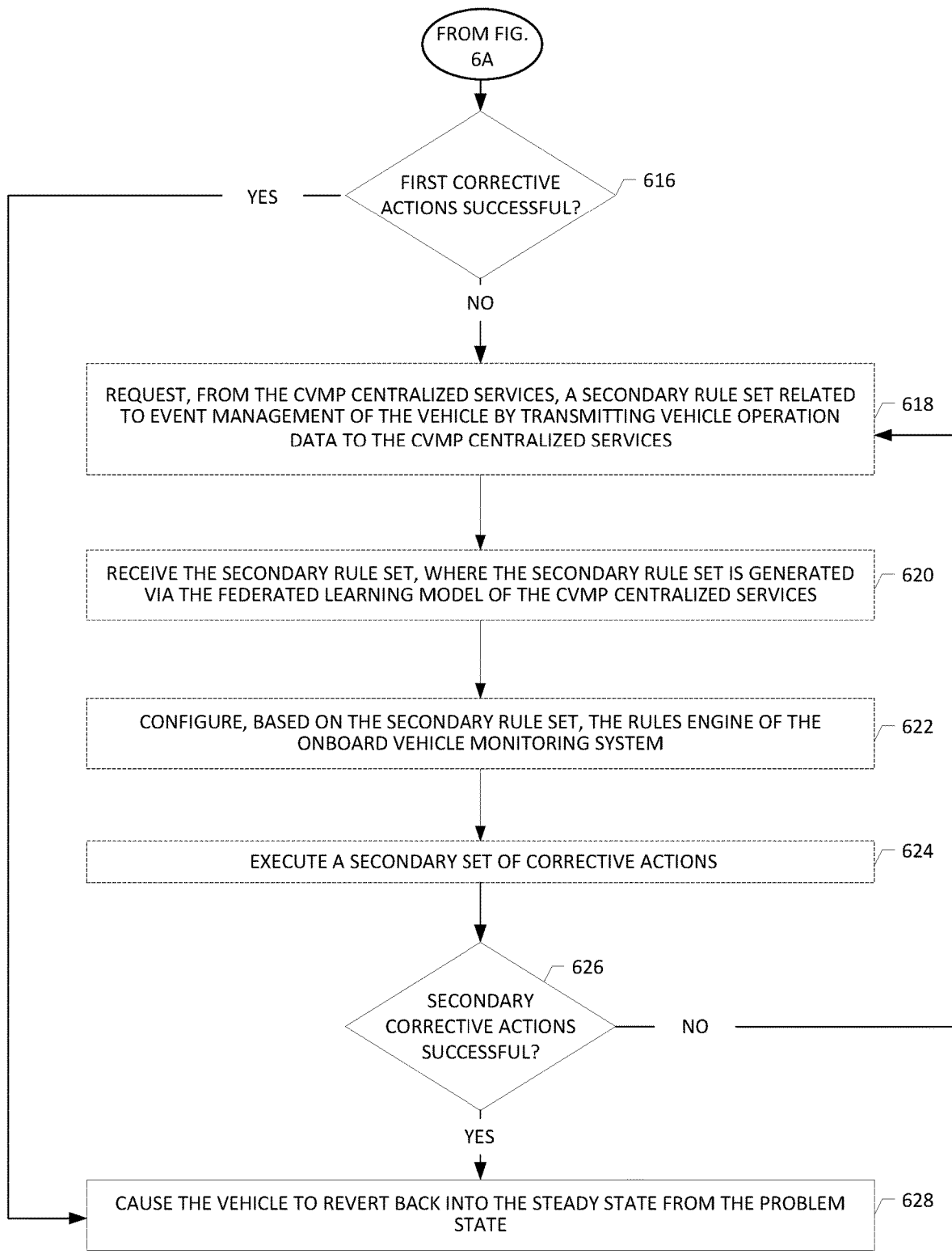

FIGS. 6A-6B illustrate flowcharts depicting example operations of an example process for managing one or more vehicles associated with a CVMP 300 in accordance with at least some example embodiments of the present disclosure. Specifically, FIGS. 6A-6B depict operations of an example process 600 for managing one or more vehicle(s) whose operation is being impacted by one or more events. In some embodiments, the process 600 is embodied by a computer-implemented process executable by any of a myriad of computing device(s), apparatus(es), system(s), and/or the like as described herein. Alternatively or additionally, in some embodiments, the process 600 is embodied by computer program code stored on a non-transitory computer-readable storage medium of a computer program product configured for execution to perform the process as depicted and described.

Alternatively or additionally, in some embodiments, the process 600 is performed by one or more specially configured computing devices, such as the CVMP vehicle apparatus 200 alone or in communication with one or more other component(s), device(s), system(s), and/or the like (e.g., such as the CVMP offboard apparatus 312). In this regard, in some such embodiments, the CVMP vehicle apparatus 200 is specially configured by computer-coded instructions (e.g., computer program instructions) stored thereon, for example in the memory 204 and/or another component depicted and/or described herein and/or otherwise accessible to the CVMP vehicle apparatus 200, for performing the operations as depicted and described. In some embodiments, the CVMP vehicle apparatus 200 is in communication with one or more external apparatus(es), system(s), device(s), and/or the like, to perform one or more of the operations as depicted and described. For example, the CVMP vehicle apparatus 200 in some embodiments is in communication with an end-user computing device, one or more external system(s), and/or the like (e.g., such as the CVMP centralized services 302). It will be appreciated that while the process 600 is described as performed by and from the perspective of the CVMP vehicle apparatus 200 for purposes of simplifying the description, the process 600 can also be performed, in total or in part, by the CVMP offboard apparatus 312 of the CVMP centralized services 302.

Referencing FIG. 6A, the process 600 begins at operation 602. At operation 602, the CVMP vehicle apparatus 200 includes means such as the sensor(s) 210, vehicle control circuitry 212, vehicle monitoring circuitry 214, communications circuitry 208, input/output circuitry 206, processor 202, and/or the like, or a combination thereof, to receive, based on output generated by a federated learning model 310 associated with the CVMP centralized services 302 of a cloud-based vehicle monitoring platform (CVMP) 300, a first rule set related to event management of a vehicle. For example, the onboard vehicle monitoring system 306 associated with a particular aerial vehicle 112 generates an initialization request. The initialization request is a request for a first rule set associated with the aerial vehicle 112. In various embodiments, one or more rules associated with a federated learning model 310 (e.g., comprised in rules database 308) is specifically configured for a particular type of vehicle (e.g., the aerial vehicle 112). The federated learning model 310 associated with the CVMP centralized services 302 determines, based on the initialization request, a first set of rules for the aerial vehicle 112 associated with the onboard vehicle monitoring system 306. The federated learning model 310, in conjunction with the CVMP offboard apparatus 312 transmits the first rule set to the onboard vehicle monitoring system 306 (e.g., via the network 110).

At operation 604, the CVMP vehicle apparatus 200 includes means such as the sensor(s) 210, vehicle control circuitry 212, vehicle monitoring circuitry 214, communications circuitry 208, input/output circuitry 206, processor 202, and/or the like, or a combination thereof, to configure, based on the first rule set, a rules engine 324 of an onboard vehicle monitoring system 306 associated with the vehicle. For example, in various embodiments, the one or more rules in the rules database 308 are crafted to configure, initialize, and/or otherwise update a rules engine (e.g., rules engine 324) associated with a particular vehicle (e.g., a particular aerial vehicle 112). The rules engine 324 in some contexts comprises a time series data analysis model and in some contexts is configured in part by the one or more rules received by the federated learning model 310 (e.g., as transmitted from the CVMP centralized services 302.

At operation 606, the CVMP vehicle apparatus 200 includes means such as the sensor(s) 210, vehicle control circuitry 212, vehicle monitoring circuitry 214, communications circuitry 208, input/output circuitry 206, processor 202, and/or the like, or a combination thereof, to receive vehicle operation data associated with the vehicle. Specifically, the vehicle state evaluation model 326 of the onboard vehicle monitoring system 306 receives vehicle operation data 336 from the data configuration manager 328.

For example, as mentioned herein, the data configuration manager 328 generates one or more portions of vehicle operation data 336 based on the data aggregated by the one or more agent(s) 330a-n. Additionally, vehicle operation data 336 associated with a particular vehicle (e.g., the aerial vehicle 112) in some contexts is generated and/or received by the CVMP centralized services 302, the environment data system(s) 108, and/or the travel operation management system(s) 106. For example, the vehicle operation data 336 in some contexts comprises data indicative of a nominal scenario, an emergency scenario, data indicative of a hazard scenario, data indicative of a logistical scenario that alters the voyage of the aerial vehicle, and/or data indicative of a change in the operation of a system affecting control of the aerial vehicle. In various embodiments, at least a portion of the travel event data is based at least in part on vehicle sensor data collected, measured, calculated, and/or otherwise generated by one or more sensors associated with the aerial vehicle. As such, vehicle operation data 336 in some contexts is any relevant data that provides contextual information for a current operation of a particular vehicle (e.g., the aerial vehicle 112).

At operation 608, the CVMP vehicle apparatus 200 includes means such as the sensor(s) 210, vehicle control circuitry 212, vehicle monitoring circuitry 214, communications circuitry 208, input/output circuitry 206, processor 202, and/or the like, or a combination thereof, to determine, by a vehicle state evaluation model 326 of the onboard vehicle monitoring system 306, a steady state of the vehicle. A steady state in some contexts is understood to mean that a vehicle, the one or more vehicle system(s) (e.g., aerial vehicle onboard system(s) 102) associated with the vehicle, and any crew members and/or passengers associated with the vehicle are operating as expected. The vehicle state evaluation model 326 generates one or more contextual data snapshots related to the current operational status of the vehicle as model output. The contextual data snapshots are one or more portions of data that have been configured for logging, analysis, ML model input, ML model training, and/or storage. For example, a contextual data snapshot captures the steady state (e.g., nominal state) of the vehicle by logging, storing, and/or otherwise saving a current configuration of the one or more vehicle systems as well as how the configuration of the one or more vehicle systems relates to the current nominal operation of the vehicle.

At operation 610, the CVMP vehicle apparatus 200 includes means such as the sensor(s) 210, vehicle control circuitry 212, vehicle monitoring circuitry 214, communications circuitry 208, input/output circuitry 206, processor 202, and/or the like, or a combination thereof, to transmit steady state data related to the steady state of the vehicle to the CVMP centralized services 302. For example, the onboard vehicle monitoring system 306 is configured to transmit (e.g., via the node manager 322) one more portions of data related to the current operation of a vehicle (e.g., steady state data, problem state data, contextual data snapshots, and/or the like) to the CVMP centralized services 302 for storage in the data store 314.

At operation 612, the CVMP vehicle apparatus 200 includes means such as the sensor(s) 210, vehicle control circuitry 212, vehicle monitoring circuitry 214, communications circuitry 208, input/output circuitry 206, processor 202, and/or the like, or a combination thereof, to determine one or more events impacting the operation of the vehicle, where the one or more events impacting the operation of the vehicle cause the vehicle to enter into a problem state. For example, based on one or more portions of vehicle operation data 336 generated, aggregated, and/or received by the data configuration manager 328, the vehicle state evaluation model 326 determines that one or more events are adversely impacting the operation of an aerial vehicle 112. In some embodiments, the vehicle state evaluation model 326 captures (e.g., generates) a contextual data snapshot comprising one or more portions of data related to the one or more events impacting the operation of the vehicle and/or one or more portions of data related to the problem state associated with the operation of the vehicle. The vehicle state evaluation model 326 transmits the contextual data snapshot to the rules engine 324.

At operation 614, the CVMP vehicle apparatus 200 includes means such as the sensor(s) 210, vehicle control circuitry 212, vehicle monitoring circuitry 214, communications circuitry 208, input/output circuitry 206, processor 202, and/or the like, or a combination thereof, to execute a first set of corrective actions. For example, the rules engine 324 receives the contextual data snapshot comprising one or more portions of data related to the one or more events impacting the operation of an aerial vehicle 112 and/or one or more portions of data related to the problem state from the vehicle state evaluation model 326. The rules engine 324 generates a first set of corrective actions based on the first rule set (e.g., generated by the federated learning model 310) received from the CVMP centralized services 302 in response to receiving the contextual data snapshot associated with the problem state of the vehicle. The rules engine 324 executes the first set of corrective actions, where executing the first set of corrective actions comprises operating one or more systems associated with the vehicle (e.g., one or more aerial vehicle onboard system(s) 102) to control the operation of the vehicle. In some embodiments, the execution of a corrective action must be confirmed via a computing device (e.g., a CVMP vehicle apparatus 200 or a CVMP offboard apparatus 312). In various other embodiments, corrective actions in some contexts are automatically executed depending on the criticality (e.g., the corresponding severity level) of the corresponding event impacting the operation of the vehicle.

Referencing FIG. 6B, at operation 616, the CVMP vehicle apparatus 200 includes means such as the sensor(s) 210, vehicle control circuitry 212, vehicle monitoring circuitry 214, communications circuitry 208, input/output circuitry 206, processor 202, and/or the like, or a combination thereof, to determine whether the first set of corrective actions was successful at mitigating the one or more events impacting the vehicle. For example, the rules engine 324 is configured to determine, in conjunction with the vehicle state evaluation model 326, if the first set of corrective actions that were executed have successfully mitigated the one or more events impacting the operation of an aerial vehicle 112 (e.g., one or more failures associated with the one or more respective aerial vehicle onboard system(s) 102). If the rules engine 324, in conjunction with the vehicle state evaluation model 326, determine that the first set of corrective actions was indeed successful, the process 600 proceeds to operation 628. Alternatively, if the rules engine 324, in conjunction with the vehicle state evaluation model 326, determine that the first set of corrective actions was unsuccessful at mitigating the one or more events, the process 600 proceeds to operation 618.

At operation 618, the CVMP vehicle apparatus 200 includes means such as the sensor(s) 210, vehicle control circuitry 212, vehicle monitoring circuitry 214, communications circuitry 208, input/output circuitry 206, processor 202, and/or the like, or a combination thereof, to request, from the CVMP centralized services 302, a secondary rule set related to event management of the vehicle by transmitting vehicle operation data to the CVMP centralized services 302. For example, the onboard vehicle monitoring system 306 generates and transmits a secondary rule set request to the CVMP centralized services 302 (e.g., via the node manager 322). The secondary rule set request in some contexts comprises data related to the one or events impacting an aerial vehicle 112 (e.g., the failure of the one or more aerial vehicle onboard system(s) 102), one or more portions of vehicle operation data 336, one or more portions of vehicle sensor data, and/or one or more portions of data related to the current problem state of the aerial vehicle 112.

At operation 620, the CVMP vehicle apparatus 200 includes means such as the sensor(s) 210, vehicle control circuitry 212, vehicle monitoring circuitry 214, communications circuitry 208, input/output circuitry 206, processor 202, and/or the like, or a combination thereof, to receive, the secondary rule set, where the secondary rule set is generated by the federated learning model 310 via the CVMP centralized services 302. In response to receiving the secondary rule set request, the CVMP offboard apparatus 312 directs the federated learning model 310 to generate, select, and/or otherwise determine a second rule set for the vehicle being impacted by the one or more events (e.g., the failures of the aerial vehicle onboard system(s) 102).

At operation 622, the CVMP vehicle apparatus 200 includes means such as the sensor(s) 210, vehicle control circuitry 212, vehicle monitoring circuitry 214, communications circuitry 208, input/output circuitry 206, processor 202, and/or the like, or a combination thereof, to configure, based on the secondary rule set, the rules engine 324 of the onboard vehicle monitoring system. The rules engine 324 and/or the time series data analysis model comprised in the rules engine 324 in some contexts is reconfigured based at least in part one the secondary rule set generated by the federated learning model 310. As such, the rules engine 324 generates, based on the secondary rule set, a secondary set of corrective actions for mitigating the one or more events impacting the vehicle (e.g., the one or more respective failures of the aerial vehicle onboard system(s) 102 of an aerial vehicle 112).

At operation 624, the CVMP vehicle apparatus 200 includes means such as the sensor(s) 210, vehicle control circuitry 212, vehicle monitoring circuitry 214, communications circuitry 208, input/output circuitry 206, processor 202, and/or the like, or a combination thereof, to execute a secondary set of corrective actions. For example, the rules engine 324 executes the secondary set of corrective actions generated based at least in part on the secondary rule set generated by the federated learning model 310 associated with the CVMP centralized services 302. Executing the secondary set of corrective actions comprises operating one or more systems associated with the vehicle (e.g., one or more aerial vehicle onboard system(s) 102) to control the operation of the vehicle (e.g., the aerial vehicle 112). In some embodiments, the execution of a corrective action must be confirmed via a computing device (e.g., a CVMP vehicle apparatus 200 or a CVMP offboard apparatus 312). In various other embodiments, the corrective actions are automatically executed depending on the criticality (e.g., the corresponding severity level) of the corresponding event impacting the operation of the vehicle.

At operation 626, the CVMP vehicle apparatus 200 includes means such as the sensor(s) 210, vehicle control circuitry 212, vehicle monitoring circuitry 214, communications circuitry 208, input/output circuitry 206, processor 202, and/or the like, or a combination thereof, to determine whether the secondary set of corrective actions was successful at mitigating the one or more events impacting the vehicle. For example, the rules engine 324 is configured to determine, in conjunction with the vehicle state evaluation model 326, if the secondary set of corrective actions that were executed have successfully mitigated the one or more events impacting the operation of the vehicle (e.g., one or more failures associated with the one or more respective aerial vehicle onboard system(s) 102 of the aerial vehicle 112). If the rules engine 324, in conjunction with the vehicle state evaluation model 326, determine that the first set of corrective actions was indeed successful, the process 600 proceeds to operation 628. Alternatively, if the rules engine 324, in conjunction with the vehicle state evaluation model 326, determine that the secondary set of corrective actions was unsuccessful at mitigating the one or more events, the process 600 reverts back to operation 618. In this manner, the operations 618-624 are executed however many times is necessary to mitigate the one or more events impacting the operation of a vehicle.

At operation 628, the CVMP vehicle apparatus 200 includes means such as the sensor(s) 210, vehicle control circuitry 212, vehicle monitoring circuitry 214, communications circuitry 208, input/output circuitry 206, processor 202, and/or the like, or a combination thereof, to cause the vehicle to revert back into the steady state from the problem state. For example, the onboard vehicle monitoring system 306 requests and receives the steady state data (e.g., a contextual data snapshot associated with the steady of the vehicle) that was stored in the data store 314 associated with the CVMP centralized services 302. As mentioned herein, a contextual data snapshot associated with a steady state of a particular vehicle (e.g., an aerial vehicle 112) in some contexts is used in one or more data recovery operations for reverting the particular vehicle from a problem state back into a steady state. The contextual data snapshot associated with the steady state comprises one or more operational parameters, data values, operational modes, and/or configurations of one or more vehicle systems (e.g., the aerial vehicle onboard system(s) 102). As such, the contextual data snapshot associated with the steady state in some contexts is utilized to reconfigure, re-initialize, and/or otherwise update the one or more vehicle systems such that the vehicle resumes operating in a manner congruent with the corresponding steady state.

Conclusion

While several example contexts are described herein with respect to processing of data by an aerial vehicle, it will be appreciated in view of this disclosure that embodiments may include or otherwise be implemented as a part of other vehicle(s), device(s), and/or the like. For example, in other contexts, embodiments of the present disclosure utilize sensor(s) of and/or display data to display(s) of other type(s) of vehicle(s), including ground vehicle(s). Alternatively or additionally, some embodiments utilize sensor(s) of and/or display data to display(s) of other device(s), including user device(s), back-end computing device(s), and/or the like. Indeed, in some embodiments, the sensor(s), computing device(s), and/or display(s) are embodied and/or otherwise included in one or more computing device(s) not integrated as part of any vehicle (e.g., as a standalone computing device). In is intended that all such contexts, device type(s), and/or the like be included within the scope of this disclosure and covered within the scope of the claims appended herein.

Although an example processing system has been described above, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer storage medium for execution by, or to control the operation of, information/data processing apparatus. Alternatively, or in addition, the program instructions can be encoded on an artificially generated propagated signal, e.g., a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a repository management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory or a random access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a client computer having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any disclosures or of what may be claimed, but rather as descriptions of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

What is claimed is:

1. A computer-implemented method, the computer-implemented method comprising:
    determining, by a vehicle state evaluation model of an onboard vehicle monitoring system, a steady state of a vehicle, wherein the steady state of the vehicle is determined based in part on a first portion of vehicle operation data;
    determining, by the vehicle state evaluation model of the onboard vehicle monitoring system and based in part on a second portion of vehicle operation data, one or more events impacting operation of the vehicle,
    wherein the one or more events impacting the operation of the vehicle cause the vehicle to enter into a problem state;
    generating, by a rules engine of the onboard vehicle monitoring system, a first set of corrective actions, wherein the first set of corrective actions is based in part on a first rule set, and
    wherein the rules engine is configured based in part on at least one of the first rule set or a subset of a federated learning model associated with cloud-based monitoring platform (CVMP) centralized services of a CVMP;

determining, based in part on executing the first set of corrective actions generated by the rules engine, that the vehicle cannot revert back into the steady state from the problem state;

in response to determining that the vehicle cannot revert back into the steady state by executing the first set of corrective actions:

requesting, from the CVMP centralized services, a second rule set related to event management of the vehicle by transmitting at least the second portion of vehicle operation data to the CVMP centralized services;

receiving the second rule set from the CVMP centralized services, wherein the second rule set is generated by the federated learning model associated with the CVMP centralized services;

configuring, based in part on at least one of the second rule set or the subset of the federated learning model, the rules engine of the onboard vehicle monitoring system;

generating, based in part on the second rule set, a second set of corrective actions;

determining that the vehicle can revert back into the steady state from the problem state by executing the second set of corrective actions; and in response to determining that the vehicle can revert back into the steady state by executing the second set of corrective actions:

causing execution of at least a portion of the second set of corrective actions to revert the vehicle back into the steady state from the problem state.

2. The computer-implemented method of claim 1, the computer-implemented method further comprising:

transmitting steady state data related to the steady state of the vehicle to the CVMP centralized services, wherein transmitting the steady state data causes storage of the steady state data in a data store associated with the CVMP centralized services.

3. The computer-implemented method of claim 2, wherein causing the vehicle to revert back into the steady state comprises:

retrieving the steady state data from the data store associated with the CVMP centralized services; and configuring one or more respective vehicle systems of the vehicle based in part on the steady state data.

4. The computer-implemented method of claim 1, wherein one or more respective corrective actions of the first set of corrective actions and the second set of corrective actions are ranked based at least in part on a predicted result associated with execution of the one or more respective corrective actions.

5. The computer-implemented method of claim 1, wherein the computer-implemented method further comprises:

transmitting event mitigation data to the CVMP centralized services, wherein the event mitigation data comprises at least one of:

data related to the one or more events that caused the vehicle to enter into the problem state, data related to one or more respective rules comprised in the first rule set and the second rule set, or data related to one or more respective corrective actions associated with the one or more respective rules comprised in the first rule set and the second rule set, wherein the data related to the one or more respective corrective actions is indicative of whether the one or more respective corrective actions were successful or unsuccessful in causing the vehicle to revert back into the steady state from the problem state.

6. The computer-implemented method of claim 5, wherein transmitting the event mitigation data to the CVMP centralized services causes updating of the federated learning model.

7. The computer-implemented method of claim 1, wherein the steady state data of the vehicle comprises at least one of:

data indicative of a configuration of one or more vehicle systems onboard the vehicle, data related to a set of vehicle operation constraints, or data related to the first portion of vehicle operation data associated with the steady state of the vehicle.

8. The computer-implemented method of claim 1, wherein the computer-implemented method further comprises:

causing rendering of an alert generated by the vehicle state evaluation model on one or more computing devices associated with the CVMP, wherein the alert comprises data related to at least one of the problem state associated with the vehicle or the one or more events impacting the operation of the vehicle.

9. The computer-implemented method of claim 1, wherein the federated learning model is iteratively retrained based in part on event mitigation data associated with a plurality of vehicles associated with the CVMP centralized services.

10. The computer-implemented method of claim 9, wherein the federated learning model is iteratively retrained on based on a predefined schedule.

11. The computer-implemented method of claim 1, wherein the second portion of vehicle operation data comprises at least one of data indicative of a nominal scenario, data indicative of an emergency scenario, data indicative of a hazard scenario, data indicative of a logistical scenario that alters a voyage of the vehicle, or data indicative of a change in the operation of a vehicle system affecting control of the vehicle.

12. The computer-implemented method of claim 11, wherein the second portion of vehicle operation data is based at least in part on vehicle sensor data gathered by one or more sensors associated with the vehicle.

13. The computer-implemented method of claim 1, wherein the computer-implemented method further comprises:

determining, by the vehicle state evaluation model of the onboard vehicle monitoring system, an event severity level associated with the one or more events impacting the operation of the vehicle.

14. The computer-implemented method of claim 13, wherein the event severity level associated with the one or more events is determined based in part on a respective event type associated with the one or more events impacting the operation of the vehicle.

15. The computer-implemented method of claim 1, wherein the CVMP is associated with an Internet-of-Things (IoT) sensing and control system.

16. An apparatus comprising:

at least one processor; and at least one non-transitory memory storing instructions that, when executed by the at least one processor, cause the apparatus to:

determine, by a vehicle state evaluation model of an onboard vehicle monitoring system, a steady state of a vehicle, wherein the steady state of the vehicle is determined based in part on a first portion of vehicle operation data;

determine, by the vehicle state evaluation model of the onboard vehicle monitoring system and based in part on a second portion of vehicle operation data, one or more events impacting operation of the vehicle, wherein the one or more events impacting the operation of the vehicle cause the vehicle to enter into a problem state;

generate, by a rules engine of the onboard vehicle monitoring system, a first set of corrective actions, wherein the first set of corrective actions is based in part on a first rule set, and wherein the rules engine is configured based in part on at least one of the first rule set or a subset of a federated learning model associated with cloud-based monitoring platform (CVMP) centralized services of a CVMP;

determine, based in part on executing the first set of corrective actions generated by the rules engine, that the vehicle cannot revert back into the steady state from the problem state;

in response to determining that the vehicle cannot revert back into the steady state by executing the first set of corrective actions:
  request, from the CVMP centralized services, a second rule set related to event management of the vehicle by transmitting at least the second portion of vehicle operation data to the CVMP centralized services;
  receive the second rule set from the CVMP centralized services, wherein the second rule set is generated by the federated learning model associated with the CVMP centralized services;
  configure, based in part on at least one of the second rule set or the subset of the federated learning model, the rules engine of the onboard vehicle monitoring system;
  generate, based in part on the second rule set, a second set of corrective actions;
  determine that the vehicle can revert back into the steady state from the problem state by executing the second set of corrective actions; and
  in response to determining that the vehicle can revert back into the steady state by executing the second set of corrective actions:
    cause execution of at least a portion of the second set of corrective actions to revert the vehicle back into the steady state from the problem state.

17. The apparatus of claim 16, wherein the instructions are further configured to cause the apparatus to:
  transmit steady state data related to the steady state of the vehicle to the CVMP centralized services, wherein transmitting the steady state data causes storage of the steady state data in a data store associated with the CVMP centralized services.

18. The apparatus of claim 17, wherein the instructions to cause the vehicle to revert back into the steady state are further configured to cause the apparatus to:
  retrieve the steady state data from the data store associated with the CVMP centralized services; and
  configure one or more respective vehicle systems of the vehicle based in part on the steady state data.

19. The apparatus of claim 16, wherein the instructions are further configured to cause the apparatus to:
  transmit event mitigation data to the CVMP centralized services, wherein the event mitigation data comprises at least one of:
    data related to the one or more events that caused the vehicle to enter into the problem state,
    data related to one or more respective rules comprised in the first rule set and the second rule set, or
    data related to one or more respective corrective actions associated with the one or more respective rules comprised in the first rule set and the second rule set,
    wherein the data related to the one or more respective corrective actions is indicative of whether the one or more respective corrective actions were successful or unsuccessful in causing the vehicle to revert back into the steady state from the problem state.

20. A computer program product comprising at least one non-transitory computer-readable storage medium having computer program code stored thereon that, in execution with at least one processor, is configured to:
  determine, by a vehicle state evaluation model of an onboard vehicle monitoring system, a steady state of a vehicle, wherein the steady state of the vehicle is determined based in part on a first portion of vehicle operation data;
  determine, by the vehicle state evaluation model of the onboard vehicle monitoring system and based in part on a second portion of vehicle operation data, one or more events impacting operation of the vehicle,
  wherein the one or more events impacting the operation of the vehicle cause the vehicle to enter into a problem state;
  generate, by a rules engine of the onboard vehicle monitoring system, a first set of corrective actions, wherein the first set of corrective actions is based in part on a first rule set, and
  wherein the rules engine is configured based in part on at least one of the first rule set or a subset of a federated learning model associated with cloud-based monitoring platform (CVMP) centralized services of a CVMP;
  determine, based in part on executing the first set of corrective actions generated by the rules engine, that the vehicle cannot revert back into the steady state from the problem state;
  in response to determining that the vehicle cannot revert back into the steady state by executing the first set of corrective actions:
    request, from the CVMP centralized services, a second rule set related to event management of the vehicle by transmitting at least the second portion of vehicle operation data to the CVMP centralized services;
    receive the second rule set from the CVMP centralized services, wherein the second rule set is generated by the federated learning model associated with the CVMP centralized services;
    configure, based in part on at least one of the second rule set or the subset of the federated learning model, the rules engine of the onboard vehicle monitoring system;
    generate, based in part on the second rule set, a second set of corrective actions;
    determine that the vehicle can revert back into the steady state from the problem state by executing the second set of corrective actions; and
    in response to determining that the vehicle can revert back into the steady state by executing the second set of corrective actions:
      cause execution of at least a portion of the second set of corrective actions to revert the vehicle back into the steady state from the problem state.

* * * * *